(12) United States Patent  
Tobiason

(10) Patent No.: US 7,091,475 B2  
(45) Date of Patent: *Aug. 15, 2006

(54) MINIATURE 2-DIMENSIONAL ENCODER READHEAD USING FIBER OPTIC RECEIVER CHANNELS

(75) Inventor: Joseph D. Tobiason, Woodinville, WA (US)

(73) Assignee: Mitutoyo Corporation, Kawasaki (JP)

( * ) Notice: Subject to any disclaimer, the term of this patent is extended or adjusted under 35 U.S.C. 154(b) by 252 days.

This patent is subject to a terminal disclaimer.

(21) Appl. No.: 10/434,508

(22) Filed: May 7, 2003

(65) Prior Publication Data

US 2004/0222365 A1 Nov. 11, 2004

(51) Int. Cl.  
*G01B 9/02* (2006.01)

(52) U.S. Cl. .............................. 250/231.16; 250/237 R

(58) Field of Classification Search ..............................  
250/231.13–231.18, 237 R, 237 G, 227.11; 341/11, 13, 14, 1  
See application file for complete search history.

(56) References Cited

U.S. PATENT DOCUMENTS

| | | | |
|---|---|---|---|
| 4,162,399 A * | 7/1979 | Hudson | 250/231.14 |
| 4,733,071 A | 3/1988 | Tokunaga | |
| 5,104,225 A | 4/1992 | Masreliez et al. | |
| 5,808,730 A | 9/1998 | Danielian et al. | |
| 5,909,283 A | 6/1999 | Eselun | |
| 6,906,315 B1 * | 6/2005 | Tobiason | 250/237 R |
| 2004/0011948 A1 | 1/2004 | Tobiason | |

FOREIGN PATENT DOCUMENTS

| | | |
|---|---|---|
| EP | 1 382 941 A1 | 1/2004 |
| JP | 59173713 | 10/1984 |
| JP | 1272917 | 10/1989 |

OTHER PUBLICATIONS

Cowley, J.M., and Moodie, A.F., "Fourier Images: I—The Point Source," May 1, 1957, *Proc. Phys. Soc. B* 70:486-496.  
Patorski, K., "The Self-Imaging Phenomenon and Its Applications," *Progress in Optics*, ed. E. Wolf, 27, 3-108, North Holland, Amsterdam 1989.

* cited by examiner

*Primary Examiner*—Thanh X. Luu  
(74) *Attorney, Agent, or Firm*—Christensen O'Connor, Johnson Kindness PLLC

(57) ABSTRACT

A 2D fiber optic encoder readhead having multiple readhead portions for sensing the two-dimensional displacement of a scale grating is disclosed. The detector channels of the readhead portions are fiber optic detector channels having respective phase grating masks. At least two of the phase grating masks have different orientations so as to facilitate the detection of displacement in at least two different directions. The 2D fiber optic encoder readhead portions are configured to detect the displacement of a self-image pattern that results from a corresponding pattern on the scale grating. The self-image pattern allows for the detection of displacement in the at least two different directions. In various exemplary embodiments, the fiber optic readhead portions are constructed according to various design relationships that insure a robust signal-to-noise ratio. Accordingly, high levels of displacement signal interpolation may be achieved. The 2D fiber optic encoder readhead portions may be assembled in a particularly accurate and economical manner and may be provided in a package with dimensions on the order of 1–2 millimeters, resulting in a very small overall readhead dimension that is dependent on the number of readhead portions that are incorporated.

36 Claims, 9 Drawing Sheets

MINIATURE 2-DIMENSIONAL ENCODER READHEAD USING FIBER OPTIC RECEIVER CHANNELS

FIELD OF THE INVENTION

This invention relates generally to displacement sensing optical encoders, and more particularly to an optical encoder utilizing optical fibers as receiver elements to provide an ultra-compact 2-dimensional position measuring system.

BACKGROUND OF THE INVENTION

Various movement or position encoders for sensing 1-dimensional (1D) linear, rotary or angular movement are currently available. These encoders are generally based on either optical systems, magnetic scales, inductive transducers, or capacitive transducers. Certain of these encoders are designed for making relative measurements. In such relative displacement or position encoders, measurements are typically made by sensing the relative change in position of the scales with respect to a reference position, which requires a sensing of the change in the scale pattern so that repetitions of the pattern can be counted. This type of position measurement may be referred to as incremental displacement measurement or incremental position sensing or measurement.

For optical encoders, a number of 1D incremental position systems have been developed. One recent system utilizing fewer parts than most previous systems is disclosed in U.S. Pat. No. 5,909,283, to Eselun. The system described in the '283 patent has a grating scale and readhead including a point source (laser diode in readhead), a Ronchi grating or holographic element, and a photodetector array. As described, the point source results in interference fringes having a spacing equal to that of the scale. The interference fringe light is transmitted through the Ronchi grating or holographic element to the photodetector array. The photodetector array is arranged to derive four channels of quadrature signals from the transmitted fringe light. One drawback of the system described in the '283 patent is that the resulting encoder is of a size that is relatively large or prohibitive for a number of applications, while another drawback is that the system generally only provides for measurements in one dimension. Furthermore, in some modern motion control systems which have optical readheads that use electronic photodetectors, as disclosed in the '283 patent, attenuation of high frequency measurement signals that are detected and transmitted over relatively long wire lengths is becoming a limiting factor.

Another type of relative position optical encoder is disclosed in U.S. Pat. No. 4,733,071, to Tokunaga. The system described in the '071 patent has a code member scale, and an optical sensor head comprising an optical fiber tip light emitter and two optical fiber tip receptors closely arranged along the code member measuring axis. The optical sensor head is rotated (yawed) to adjust phase difference between the two optical fiber tip receptors. However, the accuracy of the resulting encoder is relatively crude, and the system again generally only provides for measurements in one dimension.

Certain of these types of encoders are designed for making 2-dimensional (2D) incremental position measurements. A 2D incremental position encoder using a 2D grating scale and providing high resolution and high accuracy at an arbitrary position in a 2D plane is disclosed in U.S. Pat. No. 5,104,225 to Masreliez. However, the readhead disclosed in the '225 patent is relatively large, complex and expensive. Furthermore, the readhead disclosed in the '225 patent suffers the same general electronic signal attenuation limitations described with reference to the '283 patent.

2D absolute position measuring systems are also known. For example, 2D bar code systems have been adapted for certain low-resolution absolute 2D position measurement applications. However, the "information storage" structures of such 2D bar code systems are generally not well suited to act as a 2D scale for high-resolution position determinations. Furthermore, suitable readheads for such 2D bar code systems are also relatively large, complex and expensive. Furthermore, the electronic signal processing used with such devices severely limits the allowable rates of high speed motion that can be tracked with the devices, in comparison to the speeds required in many modern motion control systems.

A 2D position sensing device that can overcome the foregoing problems and limitations, individually or in combination, is desirable.

SUMMARY OF THE INVENTION

The present invention is directed to providing an encoder that overcomes the foregoing and other disadvantages. More specifically, the present invention is directed to an optical encoder that provides very high resolution measurements in two dimensions and which is of extremely small size, in addition to having a number of other desirable features.

A 2D fiber optic encoder readhead with multiple readhead portions for sensing the displacement of a scale in two dimensions is disclosed. In one embodiment, the scale may comprise a 2D grating pattern of reflective portions. Each readhead portion senses displacement of the 2D grating pattern of the scale along a respective direction. The readhead portions include a light source for transmitting light to the scale and detector channels within each of the readhead portions for receiving light from the scale. In accordance with one aspect of the invention, the detector channels of the encoder readhead are fiber optic detector channels.

In addition to the fact that the previously disclosed '283 patent is directed only to a single dimension measurement system, as previously outlined, electronic readhead receivers (photodetectors) such as disclosed in the '283 patent suffer limitations in converting the high frequency detector signals associated with high speed scale motion and transmitting those signals over long cables without significant signal loss or interference. In addition, electronic photodetectors and the associated circuit connections contribute to readheads that are too large for many potential encoder applications, particularly where multiple readhead portions are being used in a single readhead. It will be appreciated that the fiber optic detector channels of the present invention overcome these limitations.

In accordance with another aspect of the invention, the 2D fiber optic encoder readhead detects the displacement of the 2D grating scale in two dimensions using the readhead portions, each having multiple fiber optic detector channels having respective phase grating masks. The respective phase grating masks of at least two of the readhead portions have different orientations with respect to each other and with respect to the 2D scale grating, according to the respective directions for which the associated readhead portions detect displacement. In addition to the fact that the previously discussed '071 patent is directed only to a 1D measurement system, the optical fiber tip receptors such as those disclosed in the '071 patent have insufficient spatial resolution for fine phase signal discrimination if they have a large diameter, and gather too little light to provide a good signal if they have a small diameter. Thus, their accuracy is limited. It will be appreciated that the fiber optic detector channels of the present invention overcome these and other limitations to provide high accuracy.

In accordance with another aspect of the invention, the 2D grating scale images detected by the multiple fiber optic detector channels of the readhead portions are self-images, also known by other names such as Talbot images, which provide for relatively robust alignment tolerances and high resolution and accuracy.

In accordance with another aspect of the invention, the 2D fiber optic encoder readhead is constructed according to a design relationship based on an input aperture size of the fiber optic detector channels, to insure reliable signals and enhanced accuracy.

In accordance with a separate aspect of the invention, the fiber optic detector channels of the readhead portions are arranged in balanced pairs, to provide enhanced accuracy.

In accordance with a further aspect of the invention, 3 balanced pairs of fiber optic detector channels within each of the readhead portions are signal processed in a manner that provides enhanced accuracy.

In accordance with a separate aspect of the invention, the light source for each of the readhead portions is provided by an optical fiber, to provide an all-optical readhead, free of all limitations and costs associated with electronic assembly and electronic signals in an encoder readhead.

In accordance with a separate aspect of the invention, the various optical fibers of the 2D fiber optic encoder are selected from various types such that the encoder measurement accuracy is relatively unaffected by bending of the fiber optic readhead cable.

In accordance with a separate aspect of the invention, various embodiments of the 2D fiber optic encoder readhead are constructed in a particularly economical, accurate and compact manner.

In accordance with a separate aspect of the invention, the 2D fiber optic encoder readhead is constructed such that it may be inserted into a standard commercially available fiber optic connector configuration.

In accordance with a separate aspect of the invention, a light deflecting element is provided to deflect the readhead light path between the basic readhead elements of the readhead portions and the scale, such that the operable mounting orientation of the readhead relative to the scale is changed.

In accordance with a separate aspect of the invention, in one embodiment a remote interface box is utilized that contains appropriate electronic light sources and photodetectors that interface with the fiber optics to and from one or more fiber optic readhead portions according to this invention, and converts received optical signals to a form suitable for further signal processing and readhead position determination.

Hence, the invention overcomes the disadvantages of prior art 2D optical displacement sensing devices and provides new application possibilities with a system that can provide measurements in two dimensions at extremely high speeds and which is ultra-compact, highly accurate, and economical.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
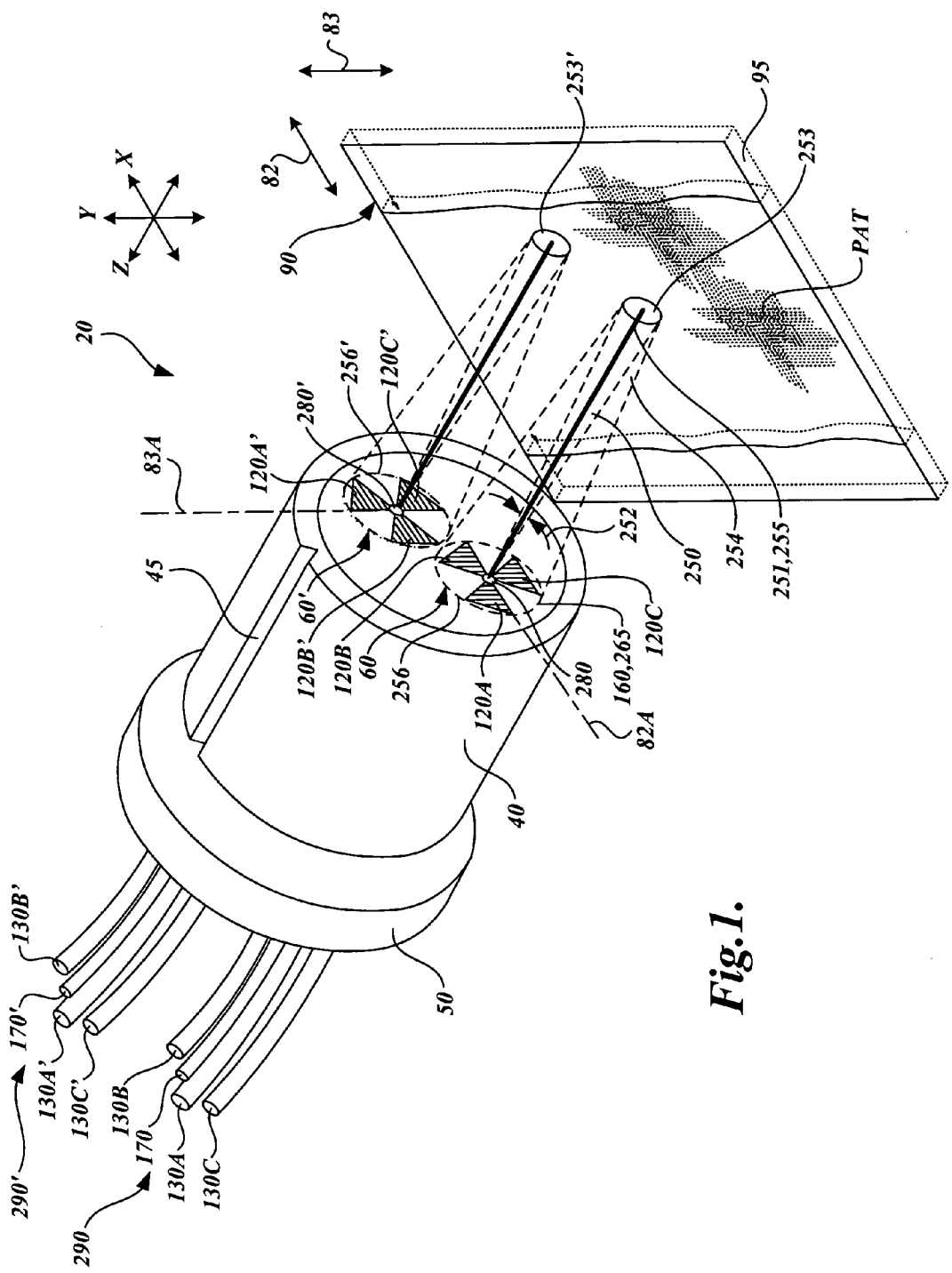
FIG. 1 is an isometric view of a first generic embodiment of a 2D fiber optic readhead arrangement according to this invention.

FIG. 1 shows a first generic embodiment of a 2D fiber optic readhead arrangement 20 according to this invention. As shown in FIG. 1, the 2D fiber optic readhead arrangement 20 includes a ferrule 40 which has an alignment groove 45 and an alignment collar 50, and which encases two readhead portions 60 and 60'. The readhead portions 60 and 60' may be formed in accordance with the teachings of U.S. patent application Ser. No. 10/298,312, entitled "High Accuracy Miniature Grating Encoder Readhead Using Fiber Optic Receiver Channels," filed Nov. 15, 2002, which is commonly assigned and hereby incorporated by reference in its entirety. As will be described in more detail below, each of the readhead portions 60 and 60' corresponds to a measurement axis 82 and 83, respectively, which are referenced to a scale 90 including a pattern PAT, which is formed on a substrate 95. It should be understood that the scale 90 can extend to any desired dimensions along the direction of the measuring axes 82 and 83. Thus, the scale 90 shown in the various figures herein can be interpreted as a segment of a much larger scale, in various exemplary embodiments according to this invention.

As will be described in more detail below, each of the readhead portions 60 and 60' is coupled to a fiber optic channel set 290 that includes three receiver optical fibers 130 and one illumination fiber 170. Thus, the fiber optic channel set 290 for the readhead portion 60 includes receiver optical fibers 130a, 130b, and 130c, and an illumination fiber

170. While each of the readhead portions 60 and 60' contain similar components, for the remainder of this application the components for the readhead portion 60' and any additional readhead portions will generally not be described in detail, as it will be understood that except for the variations in respective phase mask orientations described herein, the components for readhead portion 60 are repeated for the readhead portions 60', except with a single prime designation, and for any additional readhead portions, except with additional prime designations. As a brief example of this nomenclature, it will be understood that a description such as that above of the fiber optic channel set 290 for the readhead portion 60, which includes receiver optical fibers 130*a*, 130*b*, and 130*c*, also indicates that the fiber optic channel set 290' for the readhead portion 60' includes receiver optical fibers 130*a'*, 130*b'*, 130*c'*.

As will be described in more detail below, the readhead portion 60 also includes phase masks 120*a*, 120*b*, and 120*c* arranged over the optical receiver channel apertures provided by the ends of the receiver optical fibers 130*a*, 130*b*, and 130*c*. In various exemplary embodiments, the phase masks 120 and 120' of the readhead portions 60 and 60' are conveniently arranged in a co-planar arrangement which defines and/or coincides with a nominal receiving plane 160. As will be described in more detail below with reference to FIG. 2, the phase masks 120 and 120' are in different orientations so as to achieve spatial filtering in different respective directions.

Returning to FIG. 1, at the center of the readhead portion 60, a light source 280 emits a source light 250 generally along a source light axis 251. The source light 250 is generally monochromatic or quasi-monochromatic and has a nominal wavelength λ. The wavelength λ may be any wavelength that is usable to produce operable self-images according to the principles of this invention. The source light 250 generally diverges at a divergence half-angle 252. The source light 250 travels over a distance and illuminates the 2D grating pattern PAT of the scale 90 at an illumination spot 253 and is reflected as scale light 254 generally along a scale light axis 255. In the embodiment shown in FIG. 1, the source light axis 251 and the scale light axis 255 are parallel to the Z axis and mutually coincide. The scale light 254 travels over a distance to a self-image plane 265, which coincides with the nominal receiving plane 160. In a self-image plane 265, the scale light 254 provides an illumination field 256 including a self-image of the pattern PAT on the scale 90. The self-image is spatially filtered by the respective phase masks 120 to provide the basic respective position measurement signals of the readhead portion 60. It will be appreciated that the illumination spot 253 and the illumination field 256 may be much smaller than a typical ferrule 40 that may be used as the housing for the readhead arrangement. This feature is what allows multiple readhead portions to be utilized in a single ferrule. For example, a standard telecommunications sized ferrule in one embodiment has a diameter of approximately 2.5 mm. The illumination field 256 can be made much smaller than this dimension, thus allowing the use of multiple readhead portions within the ferrule 40.

In one embodiment, the 2D grating pattern PAT for the scale 90 has respective spatial wavelengths, also called pitches or grating pitches herein, in the two directions 82 and 83. In one embodiment, the grating pitches in the directions 82 and 83 are the same and the two directions 82 and 83 are orthogonal. However, such an embodiment is exemplary only and different respective grating pitches and non-orthogonal measuring axis directions grating axes are also within the scope of this invention.

As will be discussed in more detail below, in various exemplary embodiments the phase masks 120 and 120' of the two readhead portions 60 and 60' have different orientations that correspond respectively to the two directions 82 and 83. The phase masks 120 and 120' may be included in a single mask. In other words, the single mask is inscribed with the appropriate phase mask elements of the readhead portions 60 and 60'. This precisely fixes the positioning of the mask elements of the various readhead portions relative to one another according to the principles of this invention such that the output signals can be compensated and/or combined with each other in signal processing so as to obtain an accurate measurement. This also fixes the orientation of the various readhead portions relative to one another in a precisely known manner corresponding to the structure of the 2D grating pattern PAT of the scale 90.

The groove 45 and collar 50 of the ferrule 40 are provided to conveniently fix the yaw and Z components of the readhead alignment relative to the scale 90 during mounting of the ferrule 40 in a suitable mounting fixture. It should be appreciated that alternative embodiments of the ferrule are possible. For example, in various exemplary embodiments, the portion of the ferrule that surrounds the circumference of the single mask element is omitted or replaced with a protective ring or tube that is added later, such that the receiver optical fibers 130*a*, 130*b*, and 130*c* and the like may be easily polished flush with the end of the ferrule 40 prior to assembling the single mask element to the ferrule 40. In various other embodiments, the ferrule may have a square or rectangular outer profile, and the sides of the ferrule then provide a convenient surface for fixing the yaw component of readhead alignment relative to the scale 90 during mounting, and the Z component of readhead alignment may alternatively be set from a front surface of the readhead rather than the collar 50. One exemplary mounting fixture arrangement is described in the previously incorporated '312 application. As will be described in more detail below with respect to FIG. 9, a deflector may be fixed on the front end of the ferrule 40. It will be appreciated that with a larger ferrule more readhead portions can be included so as to enhance the robustness or accuracy of the readhead. For example, an alternate potential configuration illustrating three readhead portions will be described in more detail below with reference to FIG. 3.

With regard to other considerations for the 2D fiber optic readhead arrangement 20, of course it is important to align the orientation of the two readhead portions 60 and 60' relative to the corresponding directions of the 2D grating pattern PAT of the scale 90. In various exemplary embodiments, the ferrule 40 is assembled to, or made as an integral part of, one of the types of commercially available fiber optic connectors/ferrules that are commonly used in telecommunications for center-to-center submicron alignment and/or precise rotational alignment of optical fibers.

With regard to considerations for producing a compact readhead, it should be appreciated that each of the readhead portions 60 and 60' should be dimensioned and positioned to receive light from primarily, or preferably only, a single corresponding illumination field 256 or 256', respectively. In various exemplary embodiments, the source fiber 170 is configured or selected to provide a divergence half-angle 252 which provides a size for the illumination spot 253 which is approximately in the range of 200 to 350 microns for the half-maximum-intensity diameter of a Gaussian illumination beam, also referred to as the half-maximum diameter herein, when the distance between the 2D grating pattern PAT of the scale 90 and an operable illumination field 265, that is, the nominal operating gap, is on the order of 1.0 mm. In such embodiments, the size for the illumination field 256 is approximately in the range of 400 to 700 microns for the half-maximum diameter of a Gaussian illumination field. For such a size for the illumination field 256, in one exemplary embodiment, the receiver optical fibers 130a, 130b, and 130c have a diameter of approximately 250 μm and are positioned with their centers approximately 250 μm from the center of the illumination field 256. More generally, in various other exemplary embodiments, the receiver optical fibers 130a, 130b, and 130c are dimensioned and positioned in accordance with the teachings of the incorporated '312 application and/or as outlined with reference to FIG. 8, below. In any case, the phase masks 120a, 120b, and 120c are arranged over the optical receiver channel apertures provided by the ends of the receiver optical fibers 130a, 130b, and 130c.

In various exemplary embodiments, the center-to-center spacing of adjacent pairs of the illumination fields 256 and 256' is at least somewhat greater than the operable illumination field diameter. Thus, for example, in various exemplary embodiments where the half-maximum diameter of a Gaussian illumination field is 400 to 700 μm, the center-to-center spacing of the illumination fields 256 and 256' is at least approximately 450 to 750 μm. In such embodiments, the diameter of the readhead 20 may easily be made as small as 2.5 mm or smaller. However, it should be appreciated that care must be taken in this design range, because as the center-to-center spacing between the readhead portions is decreased, the amount of potential self-image light crossing over as "interference" between readhead portions increases. If it is desired to achieve the smallest possible readhead size while at the same time substantially eliminating such crossover interference to maintain the maximum readhead signal accuracy, in various exemplary embodiments, such interference can be eliminated by the time-multiplexing and/or wavelength filtering methods outlined further below.

In various other embodiments, for enhanced signal separation for the various readhead portions 60 and 60' under a variety of operating conditions, it is desirable to dimension the center-to-center spacing approximately two to four times the half-maximum diameter of the Gaussian illumination distribution in the illumination fields 256 and 256'. For example, for the 400 to 700 micron size range indicated above for a Gaussian illumination field 256, in various exemplary embodiments, the center-to-center spacing of adjacent pairs of the illumination fields 256, and 256' may be on the order of approximately 1.4 to 2.8 mm for relatively larger illumination fields and 0.8 to 1.6 mm for relatively smaller illumination fields. In various exemplary embodiments where the nominal operating gap is on the order of 2.0 mm, the size range for a Gaussian illumination field 256 may be approximately 800 to 1400 microns and the center-to-center spacing of adjacent pairs of the illumination fields 256, 256' and 256" may be on the order of approximately 2.6 to 5.6 mm for relatively larger illumination fields and 1.6 to 3.2 mm for relatively smaller illumination fields. Accordingly, in various exemplary embodiments, depending on a number of design factors, as indicated above, the overall diameter of the readhead 20 may easily be made as small as approximately 7 mm, 5 mm, 3 mm, or even smaller.

It should be appreciated that the foregoing discussion of compact readhead size assumes that the light source(s) of each readhead portion operates continuously. However, it should be further appreciated that due to the extremely high speed light modulation potential of the all-optical light sources and receiver channels, it is also possible to design a more compact readhead configuration than that outlined above, wherein the various illumination fields overlap the receivers of multiple readhead portions, but the sources and receivers of each respective readhead portion are operated individually and sequentially in time, such that signal interference between adjacent readhead portions is prevented.

It should also be appreciated that, alternatively, in various exemplary embodiments, individual readhead portions may use different wavelengths of light along with a matching narrow bandpass optical wavelength filter positioned to block the other wavelengths of crossover interference light from their corresponding fiber optic receiver channels.

Figure 5:
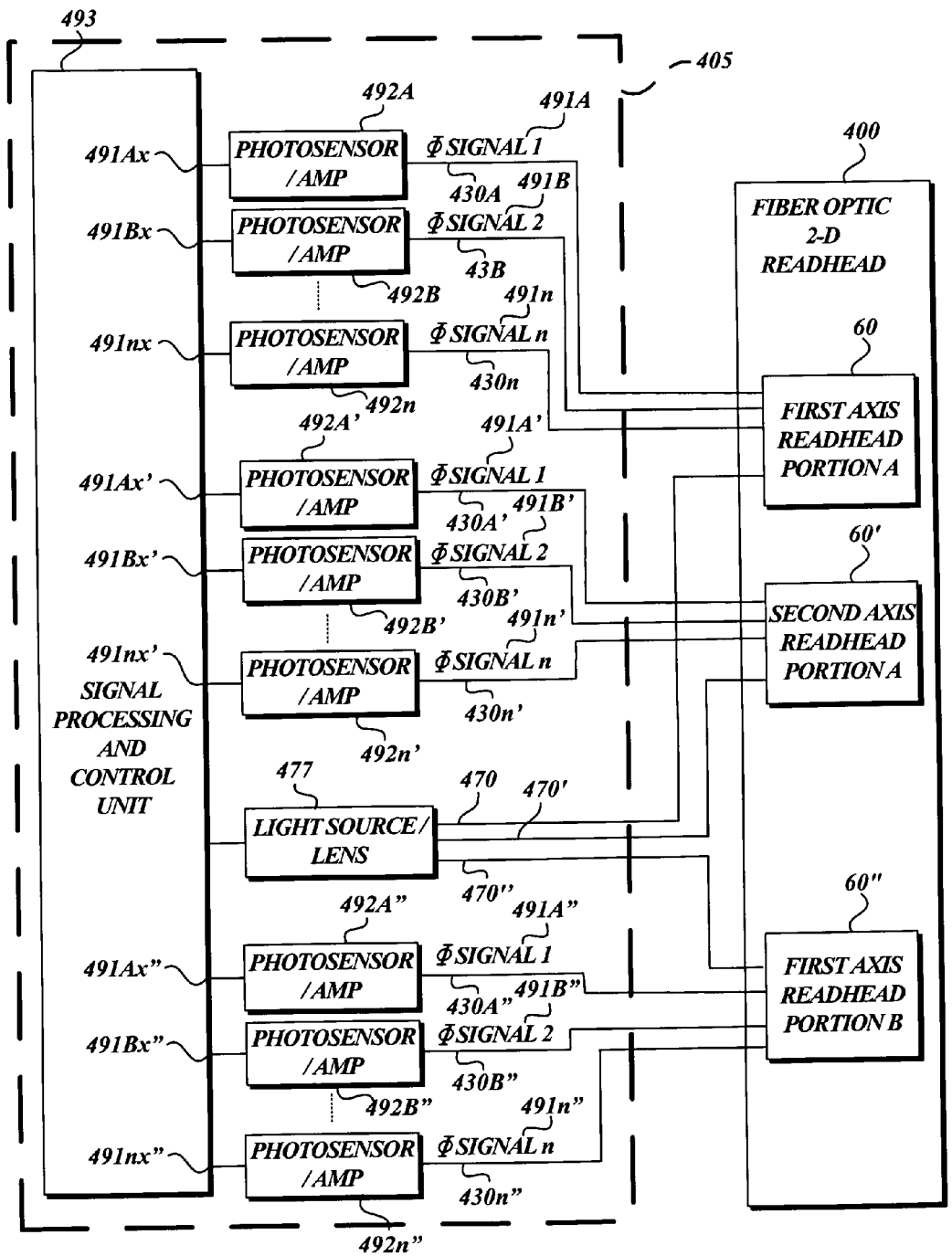
FIG. 5 shows a block diagram including a remote electronic interface unit usable in conjunction with a 2D fiber optic readhead arrangement according to this invention.

In yet other exemplary embodiments, such matching narrow bandpass optical wavelength filters may be positioned outside the readhead in a suitable fiber optic readhead signal processing remote electronics, such as that shown in FIG. 5, to filter the optical output signals from the corresponding individual readhead portions. In yet other exemplary embodiments, it should be appreciated that respective photodetectors having suitably chosen matching optical wavelength response in a suitable fiber optic readhead signal processing remote electronics can effectively augment and/or replace the respective matching narrow bandpass optical wavelength filters. In either case, the respective narrow bandpass optical wavelength filters and/or the respective photodetectors having suitably chosen matching optical wavelength response act to substantially block any light that has a wavelength different from their respective matching wavelength of light from contributing to respective electronic signals arising from the optical output signals of their corresponding respective readhead portions.

It should also be appreciated that even if different wavelengths of light are not used in different readhead portions, these same techniques can be used to block or diminish the signal-degrading effects of ambient light in a readhead according to the principles of this invention.

In yet other exemplary embodiments, other methods known to one skilled in the art may be used in an analogous manner, such as using a polarized light sources that are differently polarized for different readhead portions, transmitting the resultant polarized through polarization maintaining fibers, and for each readhead portion filtering the polarized received light with a matching polarizer to filter out the differently (i.e.—orthogonally) polarized light arising from the sources of neighboring readhead portions.

It should be appreciated that the wavelength of illumination affects the nominal operable self-image plane(s) for a readhead portion according to this invention, as described below with reference to EQUATION 1. Thus, in various exemplary embodiments, the different wavelengths of light for the different readhead portions are selected within a total range of approximately 50 nm, and operable self-images will generally result for all readhead portions at a same operable self-image plane for the various 2D readhead embodiments described herein. In various other exemplary embodiments where greater accuracy, resolution, and/or wider mounting and alignment tolerances are desired, the different wavelengths of light for the different readhead portions are selected within a total range of approximately 25 nm.

More generally, it should be appreciated that in various other embodiments, if significantly different wavelengths of light are used for different readhead portions, then such wavelengths may be selected interdependently with each other and with the selection of the scale grating pitch(es) of the 2D scale 90 to achieve an operable self-imaging gap that is shared by all the readhead portions, according to the design factors and considerations outlined below in the discussion related to EQUATION 1. It should be appreciated that for such a shared self-imaging gap, the "number" of the self-image plane (indicated by the symbol ν in EQUATION 1) that is used for the various readhead portions may be different. For example, the ninth self-image plane of one readhead portion may designed to coincide with the tenth self-image plane of another readhead portion. As one useful guideline, the operable depth of field of a self-image plane for each respective readhead portion may be assumed to be approximately on the order of ⅙, or less, of the distance between the associated self-image planes for that readhead portion. Alternatively, the operable depth of field, and/or a plane that is operable to provide sufficient self-image visibility for a readhead portion, may be determined experimentally.

In yet other exemplary embodiments, the nominal operable self-image gap for each readhead portion may be different. However, in such embodiments, each readhead portion must be individually located along the z-axis direction in the readhead, relative to the other readhead portions, such that each readhead portion will be located at a respective operable self-image plane when the overall readhead is spaced apart from the scale at correspondingly chosen nominal operating distance. For example, in such embodiments, each of the readhead portions 60, 60' and 60" may be assembled in a sub-ferrule using a separate mask substrate, and subsequently assembled into an overall readhead 40 ferrule with the proper respective z-offsets corresponding to the nominal operating distance.

For any of the time-multiplexed and/or optically filtered embodiments described above, as well as for other embodiments that eliminate crossover light interference using any other now known or later developed methods, it should be appreciated the overall readhead design can be made as compactly as allowed by the physical sizes of the various readhead components. Accordingly, with suitably chosen fiber sizes, in various exemplary embodiments the overall readhead diameter can easily be made as small as 2.5 mm, 1.8 mm, 1.25 mm, or even smaller.

Figure 2:
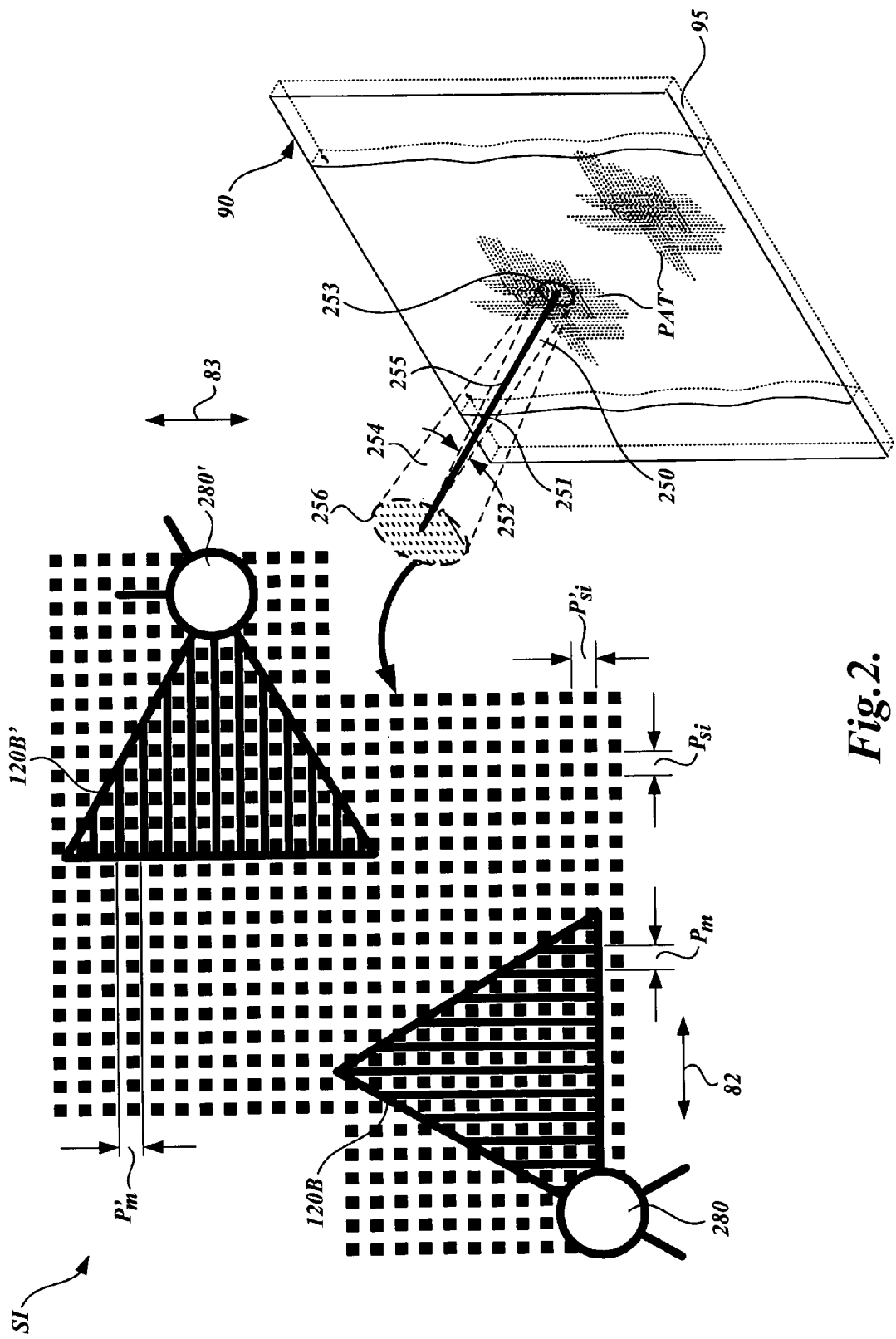
FIG. 2 is a detailed view of an exemplary self-image arising from the 2D scale pattern and two orthogonally oriented phase masks in one exemplary position relative to the self-image for the 2D fiber optic readhead arrangement of FIG. 1.

FIG. 2 shows a self-image arising from one exemplary 2D scale pattern PAT formed in accordance with the present invention, along with two orthogonally-oriented phase mask segments of two respective readhead portions in one exemplary operational position relative to the self-image. FIG. 2 generally corresponds to the 2D fiber optic readhead arrangement 20 illustrated in FIG. 1, as indicated by the partially-reproduced isometric view shown at the lower right in FIG. 2. In FIG. 2, the self-image arising at a nominal self-image plane in the illumination fields 256 is shown in greater detail. In the embodiment illustrated in FIG. 2, the two respective phase mask portions 120b and 120b' of the two respective readhead portions 60 and 60', respectively, are provided in different orthogonal orientations. In other words, the phase mask portion 120b includes grating bar elements (i.e. spatial filtering bars) that are oriented vertically, while the phase mask portion 120b' includes spatial filtering bars that are oriented horizontally. As outlined above and described in greater detail below, the phase mask portion 120b is utilized with the readhead portion 60 to provide measurements for movements along the measurement axis 82, while the phase mask portion 120b' is utilized with the readhead portion 60' to provide measurements for movements along the measurement axis 83.

The 2D scale pattern PAT on the scale 90 that gives rise to the self-image SI may in one embodiment be formed of reflective squares on a transparent or non-reflective background or substrate 95. In an alternative embodiment, the 2D grating pattern PAT may be formed of transparent or non-reflective squares on a reflective background or substrate 95. Such scales may be fabricated by known thin film processing techniques, or the like. Such techniques are used to fabricate various commercially available 1D grating scales. Similar 2D scales fabricated using methods that are usable according to the principles of this invention are also generally known in the art and are sold commercially as part of two dimensional encoder products that use conventional encoder readheads.

In various exemplary embodiments, the 2D grating pattern PAT comprises square pattern elements arranged in a regular pattern of precisely-aligned orthogonal rows and columns. In various exemplary embodiments, the rows and columns are arranged at the same grating pitch along each of their respective directions. In such embodiments, the 2D scale pattern PAT looks essentially like the self-image SI that is shown schematically in FIG. 2. However, it should be appreciated that in various other embodiments, the pattern elements can have other convenient shapes, such as rectangular, or circular, or the like, and the rows and columns need not be arranged at the same grating pitch along each of their respective directions.

In yet other embodiments, provided that the orientation of the grating bar elements of the various phase mask portions and the orientation of the rows and columns of the 2D grating pattern PAT are selected in mutually operable combinations, for example, with the grating bar element orientation parallel to the orientation of their corresponding rows or columns, the rows and columns of the 2D grating pattern PAT need not be mutually orthogonal. However, it should be appreciated that for such configurations, the signals arising from motion along orthogonal axes are not independent. Accordingly, such embodiments may require more complicated signal processing to determine a 2D position measurement according to the principles of this invention, and may otherwise be suitable only for a limited number of specialized applications. For example, such specialized applications may include those where motion is predominately along two non-orthogonal axes that match those of the encoder.

As outlined above and described in greater detail below, the self-image SI arises at nominal self-image planes when the 2D grating pattern PAT is operationally illuminated. It should be noted that the representation in FIG. 2 is ideal, while in practice, the self-image SI may generally not be this highly resolved, although it is still operable for the purposes of the invention. Specifically, it should be appreciated that in various exemplary embodiments an operable self-image plane is chosen by analysis or experiments such that the self-image SI intentionally includes a somewhat defocused self-image. In such embodiments, the distribution of light intensity along the various rows and columns of the self-image SI will exhibit an approximately sinusoidal variation, rather than a triangular, trapezoidal, or other non-sinusoidal variation, which is desirable for enhancing the measurement accuracy in various exemplary embodiments according to this invention. It should also be appreciated that at some usable self-image planes, the self-image SI will be the "negative" of the 2D scale pattern PAT. That is, the bright areas will be dark and the dark areas will be light at certain usable planes of the self-image SI. Therefore, the self-image patterns SI, and even the 2D scale pattern PAT itself, may be of the opposite "polarity" in various embodiments, in which the invention will still be operable. The various patterns and self-images described above and shown in FIG. 2 are therefore representative of a further variety of embodiments, and the polarity and relationships of the patterns and self-images is intended to be illustrative only, and not limiting.

As described above, the phase masks 120 and 120' that are provided in different orientations spatially filter the self-image SI along their respective directions, as represented by the phase mask portions 120b and 120b' in FIG. 2. The phase mask portions 120b and 120b' have spatial filtering bars that are arranged at mask pitches $P_m$ and $P'_m$, respectively. In various exemplary embodiments, along their respective spatial filtering directions the mask pitch $P_m$ is nominally the same as the self-image pitch $P_{si}$, the mask pitch $P'_m$ is nominally the same as the self-image pitch $P'_{si}$, and the spatial filtering bars have a width that is one half their corresponding mask pitch. In the embodiment shown in FIG. 2, the self-image pitch is the same in both directions, that is, $P'_{si}=P_{si}$. In various other exemplary embodiments, the spatial filtering bars may have another selected width or combination of widths, such that spatial filtering harmonics are reduced in the signal that arises as a respective phase mask moves relative to the self-image SI along a respective measuring axis.

With respect to the complete phase mask 120 of FIG. 1, as will be described in more detail below, in various exemplary embodiments the respective phase mask portions 120a, 120b, and 120c may be arranged at respective spatial phase positions of 0°, 120°, and 240° with respect to the pitch $P_{si}$ of the self-image SI along the measuring axis 82, to produce a three-phase set of optical signals. The respective phase mask portions 120a', 120b', and 120c' may be similarly arranged along the direction 83.

As illustrated in FIG. 2, as the phase mask portion 120b is moved horizontally (along the measurement axis 82) with respect to the self-image SI, the spatial filtering bars of the phase mask portion 120b move across the various columns of light and dark elements of the self-image pattern SI. It should be appreciated that at various different positions along the measurement axis 82, the spatial filtering bars will block different amounts of the light provided by the lighter elements of the self-image pattern SI. Thus, as the phase mask portion 120b is moved horizontally (along the measurement axis 82) with respect to the self-image SI, the net optical signal corresponding to the light transmitted by the phase mask portion 120b undergoes a periodic variation corresponding to the self-image pitch $P_{si}$. Similarly, as the phase mask portion 120b' is moved vertically (along the measurement axis 83) with respect to the self-image SI, the spatial filtering bars of the phase mask portion 120b' move across the various rows of the self-image pattern SI, to provide a similar net optical signal that undergoes a periodic variation corresponding to the self-image pitch $P'_{si}$. In various exemplary embodiments, a readhead arrangement according to the principles of this invention is configured such that these respective periodic variations are nearly ideal sinusoidal functions of the displacements along the respective measuring axes 82 and 83. This configuration allows for displacement or position measurements to be determined along each of the two measurement axes 82 and 83, independently or in combination, in accordance with standard encoder signal processing that is known in the art and as taught in the incorporated '312 application.

It should be appreciated that the various phase mask portions of the readhead portions 60, such as the phase mask portion 120b, are configured such that their net optical signal at a given position along the measurement axis 82 is substantially unchanged by orthogonal motion along the measurement axis 83. For example, in various exemplary embodiments, the effective lengths of the openings between the spatial filtering bars along the direction of the measurement axis 83 are made, separately or in combination, nominally equal to an integer multiple of the self-image pitch $P'_{si}$. Similarly, the various phase mask portions of the readhead portions 60', such as the phase mask portion 120b', are configured such that their net optical signal at a given position along the measurement axis 83 is substantially unchanged by orthogonal motion along the measurement axis 82.

It will be appreciated that, in comparison to the 1D readhead and scale embodiments disclosed in the incorporated '312 application, for the various detector channels of the 2D readhead and scale embodiments disclosed herein, the relative signal to noise ratio will be lower for measurements along each of the measurement axes 82 and 83 than it would be for similar measurements made along a typical 1D scale. This difference arises because the 2D scale pattern PAT gives rise to a resulting self-image SI such that the "square" pattern elements shown in FIG. 2 can nominally fill, at most, 50% of the area of the openings between the spatial filtering bars. In contrast the "bar" pattern elements corresponding to a typical 1D scale can nominally fill 100% of the openings. Thus, the sinusoidal signal variation provided by the 2D scale pattern PAT of the embodiment shown in FIG. 2, is nominally one half of the sinusoidal signal variation that can be provided by a typical 1D scale pattern. A related design consideration is that embodiments that use a reflective 2D scale in which the relatively smaller elements of the 2D pattern are reflective, for example the small pattern elements of the 2D patterns PAT disclosed herein, the DC component of the output signals will not be substantially larger the DC component of the output signals derived from a typical 1D scale. However, for embodiments that use a reflective 2D scale in which a relatively larger proportion of the 2D pattern is reflective, the DC component of the output signals may be substantially larger.

Figure 3:
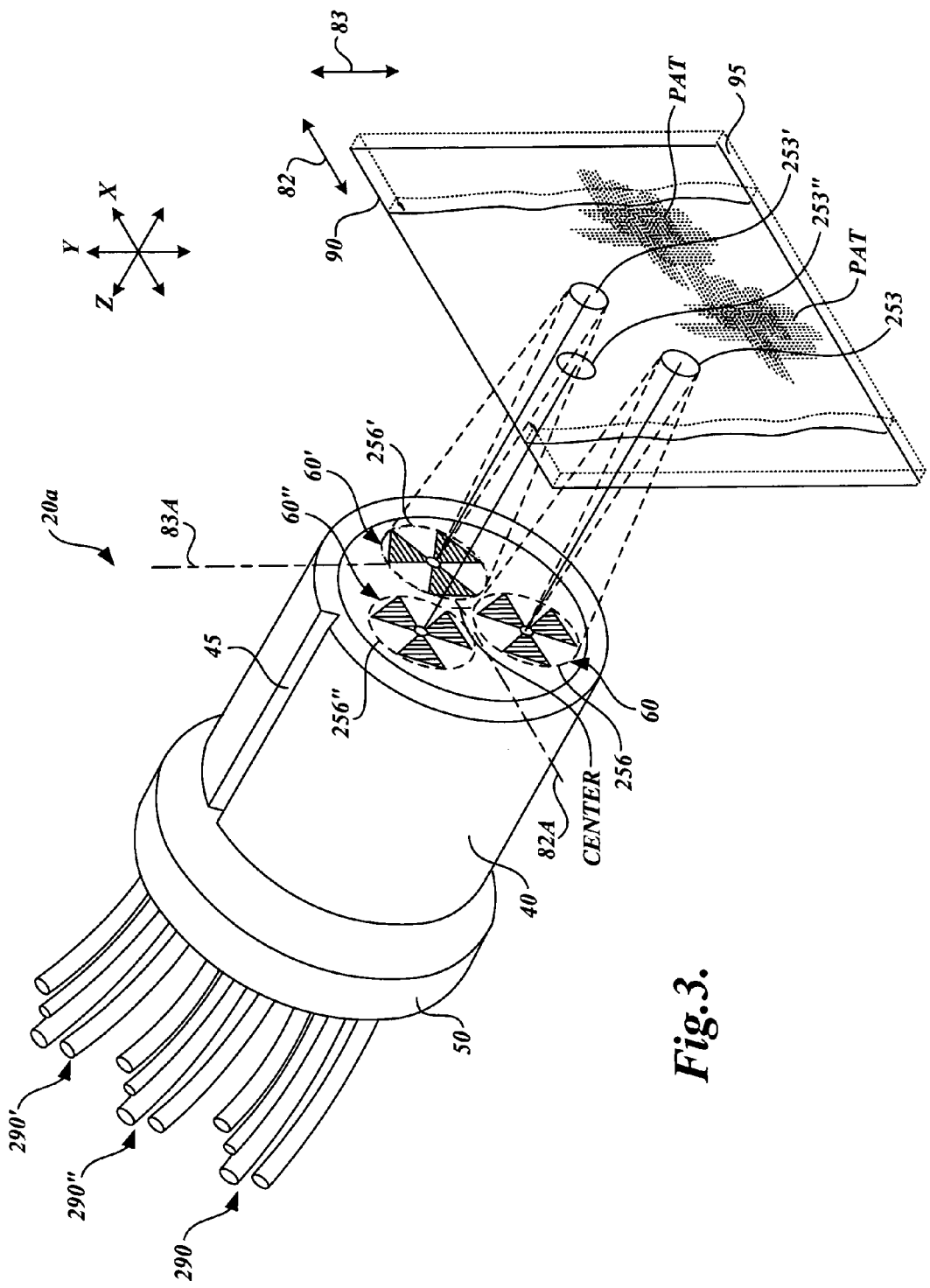
FIG. 3 is an isometric view of a second generic embodiment of a 2D fiber optic readhead arrangement according to this invention.

FIG. 3 shows a second generic embodiment of a 2D fiber optic readhead arrangement 20a according to this invention. The readhead arrangement of FIG. 3 is similar to that of FIG. 1, except that there are now three readhead portions 60, 60', and 60" arranged in a compact configuration approximately as shown in FIG. 3. In the embodiment shown in FIG. 3, the readhead portions 60, 60' are as previously described with reference to FIGS. 1 and 2, and the readhead portion 60" is identical to the readhead portion 60 in construction and orientation. The readhead portion 60" is also generally aligned with the readhead portion 60 along the measuring axis direction 83. Otherwise, similarly numbered elements of the readhead arrangements 20 and 20a are similarly constructed and function similarly.

For enhanced robustness with respect to misalignments, including yaw misalignment in particular, the readhead portions 60 and 60" are arranged in a "balanced pair" configuration, as follows. It should be appreciated that, when the readhead 20a has a yaw misalignment relative to the scale 90, the symmetric arrangement of the readhead portions 60 and 60" provides that respective position measurements from the readhead portions will nominally differ according to approximately equal and opposite offset amounts, relative to the nominal position of a point CENTER on the line 82A that is midway between the effective centers of the readhead portions 60 and 60". It will be appreciated that, in various exemplary embodiments, the line 82A is parallel to the measuring axis 82, and coincides with the effective center of the readhead portions 60 and 60". Thus, if the appropriate signals from each of the readhead portions 60 and 60" are averaged, the equal and opposite offset amounts ideally compensate each other, negating the effects of yaw misalignment to provide a reliable yaw-insensitive position measurement along the measuring axis 82 that corresponds to the position of the point CENTER.

Furthermore, given the known spacing between the effective centers of the readhead portions 60 and 60", by subtracting one of their position measurements from the other, the amount of yaw misalignment can be determined. A determined yaw misalignment can then be combined with the known spacing from the point CENTER to a line 83A, that coincides with effective center of the readhead portion 60', to determine the amount of offset of the effective center of the readhead portion 60' along the line 83A, that is, along the measuring axis 83, due to the yaw misalignment. When the offset along the line 83A is subtracted from the corresponding position measurement of the readhead portion 60', the result negates the effects of yaw misalignment to provide a reliable yaw-insensitive position measurement along the measuring axis 83 that also corresponds to the position of the point CENTER.

The embodiment shown in FIG. 3 thus illustrates a miniature yaw-insensitive 2D fiber optic readhead configuration having as few as three readhead portions. With regard to practical readhead fabrication and assembly, the arrangement of three readhead portions shown in FIG. 3 can be included in a readhead diameter that is approximately the same as, or minimally larger than, the readhead diameter used for the two readhead portions arranged as shown in FIG. 1. Accordingly, in various exemplary embodiments, depending on a number of design factors similar to those previous described with reference to FIG. 1, the overall diameter of the readhead 20a may easily be made as small as approximately 7 mm, 5 mm, 3 mm, or even smaller.

It should be appreciated that in various exemplary embodiments the net effect achieved according to the foregoing description of yaw-compensation for the embodiment shown in FIG. 3 may be achieved by variety of different signal combinations and/or sequences of signal processing operations. Thus, the foregoing description is illustrative only, and not limiting.

It should be further appreciated that, in various exemplary embodiments, the readhead 20a can include an additional readhead portion 60''' that is identical to the readhead portion 60' in construction and orientation, generally aligned with the readhead portion 60' along the measuring axis direction 82, and symmetrically located with respect to the point CENTER. In such embodiments, position measurements from the readhead portions 60' and 60''' may be processed in a manner analogous to that previously described for the readhead portions 60 and 60", as an alternative method of providing a reliable yaw-insensitive position measurement along the measuring axis 83 that also corresponds to the position of the point CENTER. Thus, with respect to various exemplary embodiments of a yaw-insensitive readhead according to this invention, the readhead arrangement 20a shown in FIG. 3 is illustrative only, and not limiting.

Figure 4:
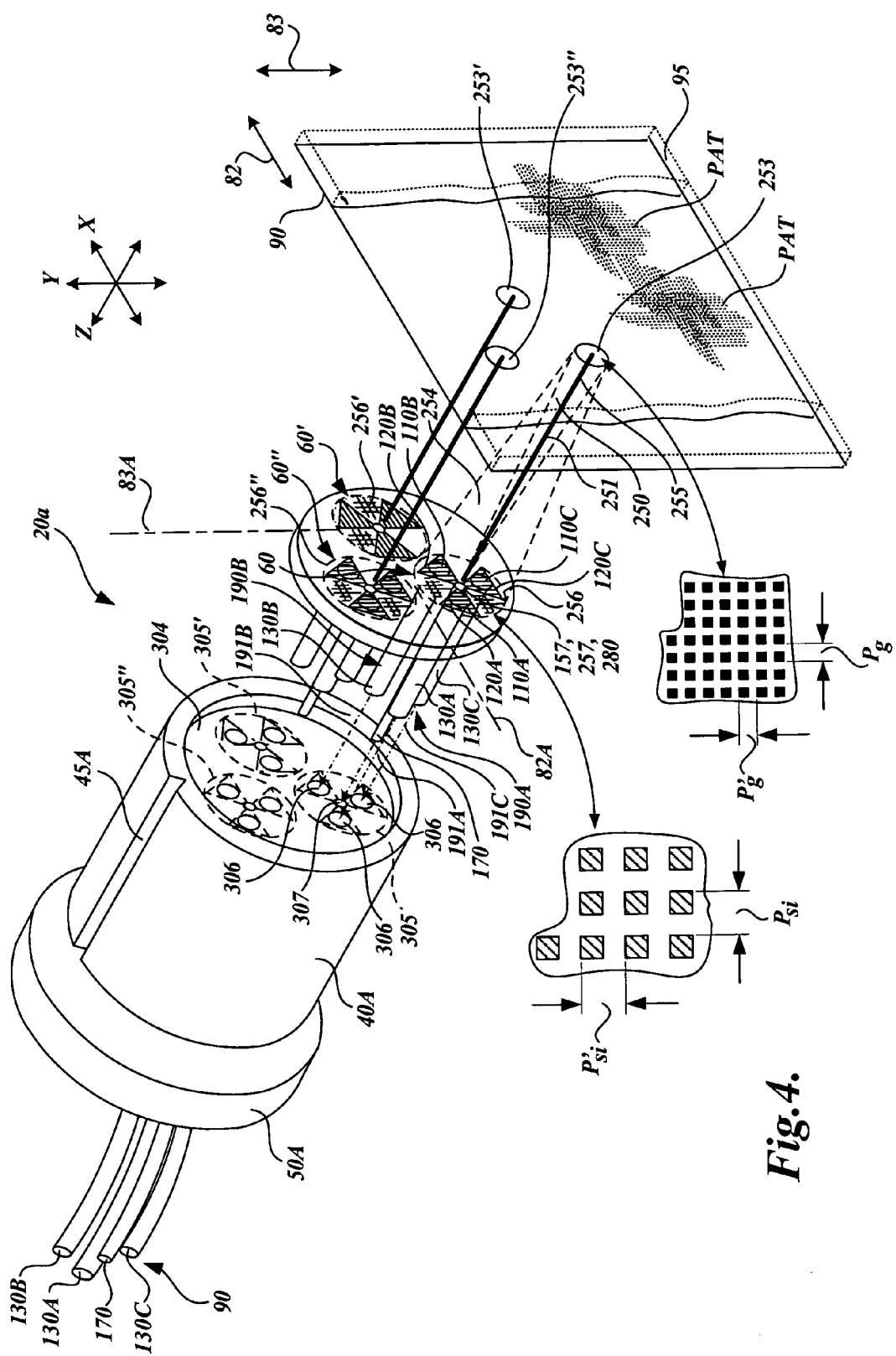
FIG. 4 is a partially exploded isometric view of the second generic embodiment of the 2D fiber optic readhead arrangement of FIG. 3.

FIG. 4 is a partially exploded view of the readhead arrangement of FIG. 3. As shown in FIG. 4, in the readhead arrangement 20a, the readhead portion 60 corresponds to three fiber optic receiver channels 190a, 190b, and 190c. The fiber optic receiver channel 190a includes a receiver channel aperture 110a, a phase mask 120a, and a receiver optical fiber 130a. The receiver channel aperture 110a is located behind the phase mask 120a. Similarly, the fiber optic receiver channel 190b includes a receiver channel aperture 110b, a phase mask 120b, and a receiver optical fiber 130b. Similarly, the fiber optic receiver channel 190c includes a receiver channel aperture 110c, a phase mask 120c, and a receiver optical fiber 130c.

For each fiber optic receiver channel 190, the phase mask 120 includes a grating that completely covers the receiver channel aperture 110, acting as a spatial filter for incoming illumination. As will be described in more detail below, the phase masks 120 and 120" have a different orientation than the phase mask 120'. The receiver optical fiber 130 is aligned with the receiver channel aperture 110 such that nominally all illumination received by the receiver channel aperture 110 is channeled down the optical fiber 130 to provide an optical signal 191. In various exemplary embodiments the receiver channel aperture 110 is simply a flat end of the receiver optical fiber 130. In various other exemplary embodiments the receiver channel aperture 110 is a shaped end of the receiver optical fiber 130. In various other exemplary embodiments the receiver channel aperture 110 is a compact refractive or diffractive lens, which gathers the incoming illumination through the phase mask 120, concentrates the light, and directs the light to the end of the receiver optical fiber 130, which is aligned to receive the light efficiently. For reasons described in the incorporated '312 application, in various exemplary embodiments each receiver channel aperture 110 spans at least one full period or pitch of the associated phase mask 120, making the phase of the optical signal passing into the receiver channel aperture 110 at least somewhat insensitive to the positioning of the light collecting area of the receiver channel aperture 110 relative to the light-blocking elements of the phase mask 120. In various other exemplary embodiments each receiver channel aperture 110 spans at least three full periods of the associated phase mask 120, making the phase of the optical signal passing into the receiver channel aperture 110 even less sensitive to the positioning of the light collecting area of the receiver channel aperture 110. More generally, the more periods of the phase mask 120 that are spanned by the receiver channel aperture 110, the less sensitive the phase of the optical signal passing into the receiver channel aperture 110 will be to its positioning. The receiver channel aperture 110, the phase mask 120 and the end of the receiver optical fiber 130 of each fiber optic receiver channel 190 are fastened in a fixed relationship to each other by adhesives or other suitable methods.

The location of the receiver channel apertures 110 is conveniently described with reference to a channel arrangement center 157 of the fiber optic receiver channel arrangement. In various high accuracy optical fiber readhead embodiments according to this invention, the channel arrangement center 157 is positioned to coincide with the nominal center of any illumination field presented to the fiber optic receiver channel arrangement. The effective center of each respective receiver channel aperture 1110a–1110c is located at a respective location radius from the channel arrangement center 157. The receiver aperture location radius is generically indicated as $R_{AL}$ herein. For purposes of this invention, in various embodiments where a receiver channel aperture 110 does not have an obvious geometric center, the effective center may be taken as the centroid of the aperture area.

Useful receiver aperture location radii, and aperture areas, may be determined according to the principles of this invention as discussed in detail with reference to FIGS. 6–8, below. In various exemplary embodiments, for each readhead portion 60, the receiver channel apertures 110 are identical and their respective location radii are identical. Generally, using identical fiber optic receiver channels 190 in a 2D fiber optic readhead according to this invention allows simpler construction, simpler signal processing and relatively higher measurement accuracy. However, more generally, the receiver channel apertures 110 and/or their respective location radii need not be identical in various exemplary embodiments according to this invention.

The fiber optic receiver channels 190 are generally arranged in a fixed relationship to each other. In particular, for each readhead portion 60, the gratings of the phase masks 120 of each fiber optic receiver channel 190 are nominally coplanar and are fixed in a particular spatial phase relationship with respect to one another in the receiving plane 160 (see FIG. 1). As will be described in more detail below, the phase masks 120 and 120" are fixed with a different spatial filtering orientation than the phase mask 120'. In various exemplary embodiments the phase masks 120 are fixed relative to one another by fabricating them on a single mask substrate.

It should be appreciated that although FIGS. 1, 3 and 4 show each of the readhead portions 60, 60' and 60" assembled in a single ferrule 40 using a single mask substrate, in various other exemplary embodiments according to this invention, each of the readhead portions 60, 60' and 60" may fabricated as separate elements, much as disclosed in the incorporated '312 application. For example, each of the readhead portions 60, 60' and 60" may be assembled in a sub-ferrule using a separate mask substrate, and subsequently assembled into an overall ferrule similar to the ferrule 40 according to the principles of this invention. In such embodiments, it should be appreciated that for each of the readhead portions 60, 60' and 60", the receiver plane 160 is arranged to nominally coincide with the self-image plane 265 as previously described with reference to FIG. 1. However, it is not strictly necessary that these planes are designed and assembled to be the same plane for all the individual readhead portions, provided that each plane is individually designed and assembled to be compatible with an eventual nominal operating gap as outlined further below, and that nominal operating gap is sufficiently well controlled during actual mounting and operation.

In any case, as previously outlined, each of the readhead portions 60 is arranged to provide a self-image of the grating structure of the 2D scale pattern PAT. The basic principle of self-images, also known as Talbot images, is well known and is not described in detail here. One classic analysis is presented in the paper by Cowley, J. M., and Moodie, A. F., 1957, *Proc. Phys. Soc.* B, 70, 486, which is incorporated herein by reference. As shown in FIG. 4, the self-imaging arrangement includes a light source 280 and the scale 90, separated by a source gap. The dimension of the source gap is generally designated as either $z_S$ or, if the source gap and an image gap are the same, as z herein. The scale 90 is aligned along the measuring axes 82 and 83 and includes scale pattern grating elements which in various exemplary embodiments are precisely aligned in rows and columns along the measuring axes 82 and 83, respectively. The grating elements are arranged periodically along the measuring axes 82 and 83 according to the scale grating periods $P_g$ and $P'_g$, respectively, generally indicated herein as respective scale wavelengths, grating periods, pitches or grating pitches. Various features of the 2D scale pattern PAT have been previously described in the discussion related to FIG. 2.

The X, Y and Z axes shown in FIG. 4 may be defined with reference to the plane of the scale 90. The X axis is parallel to the plane of the scale 90 and to the measuring axis 82, while the Y axis is parallel to the plane of the scale 90 and to the measuring axis 83. The X-Y plane is parallel to the plane of the scale 90 and the Z axis is perpendicular to that plane.

The illumination field 256 has an illumination field center 257 and a nominal illumination field radius 258. As was described above with respect to FIG. 2, the self-image is an image consisting of a pattern of light and dark areas, that are aligned along the measuring axes 82 and 83. The light and dark areas are periodic in the directions parallel to the measuring axes 82 and 83 according to respective self-image period(s), generally indicated herein as the self-image period(s) or self-image pitch(es) $P_{si}$ and $P'_{si}$, corresponding to the scale grating periods $P_g$ and $P'_g$, respectively, as illustrated in FIG. 4.

In the self-imaging arrangement, the self-image plane is parallel to the plane of the scale 90. It should be appreciated that self-images are localized in space at a particular set of self-image planes. When the light source 280 is effectively a point source, and the arrangement is approximately as shown in FIG. 4, the self-image conditions for the usable self-image planes, including both "in phase" images and "reverse images" are:

$$\frac{z_s z}{z_s + z} = 2v \frac{P_g^2}{\lambda} \qquad \text{(Eq. 1)}$$

and for the magnification of an image pitch $P_{si}$ relative to the corresponding grating pitch $P_g$:

$$P_{si} = \frac{z_s + z}{z_s} P_g \qquad \text{(Eq. 2)}$$

where:
v=0, 1, 2, . . .
$z_s$ is the source gap;
z is the image gap; and
λ is the wavelength of the source light.

Thus, for the configuration shown in FIG. 4, with $z=z_s$ usable self-image planes are located at integer multiples of $2P_g^2/\lambda$ and the image pitch $P_{si}$ will be twice the grating pitch $P_g$ and the image pitch $P'_{si}$ will be twice the grating pitch $P'_g$.

Generally, in various exemplary embodiments, the scale grating periods $P_g$ and $P'_g$ are made equal or approximately equal. However, this is not strictly necessary. In various other exemplary embodiments, if significantly different scale grating periods $P_g$ and $P'_g$ are used, it should be appreciated that the different scale grating periods must be chosen interdependently and the readhead 20a must be arranged approximately at a self-imaging gap that is operable to provide sufficient self-image visibility for both of the scale grating periods $P_g$ and $P'_g$, all according to the design factors and considerations outlined above in the discussion related to EQUATION 1. As previously stated, as one useful guideline, the operable depth of field of a self-image plane may be assumed to be on approximately be on the order of ⅙ of the distance between associated self-image planes. Alternatively, the operable depth of field, and/or a plane that is operable to provide sufficient self-image visibility for scale grating periods $P_g$ and $P'_g$, may be determined experimentally. It should be appreciated that in various exemplary embodiments, individual readhead portions may also use significantly different wavelengths of light in order to provide an additional degree of design freedom for achieving substantially similar or identical self-image planes for significantly different scale grating periods.

It should be appreciated that there are also images generally known as Fresnel images located at planes between the self-image planes. So long as the pitch of the phase masks 120 are adjusted to match the pitch of a chosen Fresnel image, Fresnel images may be used as self-images according to the principles of this invention and are encompassed within the term self-image as used herein. The characteristics of Fresnel images can be understood and applied with reference to the article by Krzysztof Patorski, The Self-Imaging Phenomenon and Its Applications, *Progress in Optics*, ed. E. Wolf, 27, 3–108, North Holland, Amsterdam 1989.

In various other embodiments according to this invention, the 2D scale 90 is a reflective phase grating type scale specifically constructed such that the $0^{th}$ order reflection from the scale is suppressed. While the self-images of a phase grating are not usable for an encoder, other usable images are available that give stronger signal than available with an amplitude grating such as that in the analysis above. It should be appreciated that for such embodiments, the location of the usable images deviates from the location of the self-images in the analysis above. The distance between the best usable image planes will remain the same as analyzed above, except there will be a certain additional offset in the gap between the scale and the first usable image plane of half the distance between usable image planes. For instance, a phase grating of 20 micron period with source wavelength 780 nm in a reflective configuration with $z=z_s$ will have usable image planes (with successively opposing phases) at nominal gaps of $z=0.513 +v*1.026$ mm, $v=1,2,3\ldots$, neglecting possible offsets from mask and scale substrate thicknesses. The offset required to adjust the gap for best operation may easily be determined experimentally by observing the fiber optic receiver channel signals at various operating gaps. Alternatively, appropriate analysis or simulation may be used to determine the additional offset.

In various exemplary embodiments according to this invention, a particularly simple and effective embodiment of the light source 280 is the end of a single optical fiber that transmits coherent light provided by a remote laser diode or other suitable light source, as exemplified by the illumination fiber 170. In various other exemplary embodiments, the light source 280 is two or more such sources arranged at a precise spacing. In yet other various other exemplary embodiments, the light source 280 is a periodic array of source grating apertures arranged at the end of one or more optical fibers that transmits light from a remote LD or LED or other suitable light source. The source grating apertures have a prescribed width and a prescribed period. In yet other exemplary embodiments, the light source 280 is provided by a miniature solid state laser element, an array of such elements, or a source grating and a miniature LED element contained in the 2D fiber optic readhead. In such cases it should be appreciated that the readhead construction may become more complex and costly, and some of the benefits of an all-optical readhead are lost. However, even in such cases, at least some of the benefits of a readhead incorporating an all-optical receiver channel arrangement according to this invention will remain, and other benefits may be gained.

As shown in FIG. 4, the light source 280 emits the source light 250, generally along a source light axis 251. The source light 250 travels over a distance z equal to a source gap, and illuminates the 2D scale pattern PAT on the scale 90 at an illumination spot 253. The illumination spot 253 reflects light as scale light 254 generally along the scale light axis 255. In the embodiment shown in FIG. 4, the source light axis 251 and the scale light axis 255 are parallel to the Z axis and mutually coincide. The scale light 254 travels over a distance z equal to the image gap to a self-image plane 265 (see FIG. 1). In the self-image plane 265, the scale light 254 provides an illumination field 256 including the self-image 266 consisting of light and dark areas at the respective self-image pitches $P_{si}$ and $P'_{si}$, as previously described.

The receiver plane 160, previously described with reference to FIG. 1, is arranged to nominally coincide with the self-image plane 265. It should be appreciated that the self-image actually exists in "less focused" planes adjacent to the previously described "perfect" self-image planes. In some exemplary embodiments, the receiver is intentionally arranged to nominally coincide with such "less focused" self-image planes, and an adequate or desired image is still detected according to the principles of this invention. For example, such "less focused" self-image planes may be intentionally chosen to suppress unwanted higher-order spatial harmonic content in the self-image. The channel arrangement center 157 is also nominally aligned with the illumination field center 257. It should be appreciated that in this embodiment of the 2D fiber optic readhead arrangement, the source 280 is also nominally aligned with the illumination field center 257. The alignment of all components is readily achieved in various exemplary embodiments by the use of an alignment hole set 304 with alignment portions 305 generally located proximate to and aligned with the phase masks 120a–120c and having the required number of receiver fiber holes and, source fiber holes, if applicable. The alignment hole set 304 may be provided in a plate inserted into the ferrule 40a, or alternatively by holes provided directly in the ferrule 40a. In either case, the various fiber ends are inserted and fixed in the appropriate holes to provide the required alignments. In various exemplary embodiments, the receiver optical fibers 130a, 130b, and 130c and are polished flush with the end of the element that includes the alignment hole set 304 prior to assembling the element carrying the phase masks 120. In such embodiments, if the alignment hole set 304 is provided directly in the ferrule 40a, the portion of the ferrule that surrounds the element carrying the phase masks 120 may be omitted or replaced with a protective ring tube that is added later. FIG. 4 shows the alignment hole set 304 with the alignment portions 305. The alignment hole set 304 is to be positioned proximate to the phase masks 120, not in the "exploded" position illustrated. The alignment portions 305 have receiver fiber holes 306 and a source fiber hole 307, if applicable in various embodiments.

In the nominally aligned receiver plane 160 and self-image plane 265, for each respective fiber optic receiver channel 190, the respective phase mask 120 spatially filters the incoming self-image illumination. In the exemplary embodiment shown in FIG. 4, the respective phase masks 120a, 120b and 120c each have a mask pitch $P_m$ that is the same as the corresponding image pitch $P_{si}$, and they are arranged at respective spatial phase positions of 0 degrees, 120 degrees and 240 degrees in terms of the self-image 266. Thus, the fiber optic receiver channels 190a, 190b and 190c receive illumination that is similarly spatially filtered except for a spatial phase difference. It will be appreciated that as the scale 90 moves by an increment $P_g$ or $P'_g$ along a respective measuring axis, the self-image moves by an increment $P_{si}$ or $P'_{si}$ relative to the phase masks 120. Thus, the optical signals 191a, 191b and 191c corresponding to the optical receiver channels 190a, 190b and 190c show approximately identical sinusoidal intensity variations as the scale 90 moves along the respective measuring axis 82, but with relative phase shifts of 120 degrees. As illustrated in FIG. 4, the phase masks 120 of the readhead portion 60 are oriented similarly to the phase masks 120" of the readhead portion 60". In contrast, the phase masks 120' of the readhead portion 60' are oriented perpendicularly to the phase masks 120 and 120" of the readhead portions 60 and 60". Thus, as the readhead is moved along the measurement axis 82, the readhead portions 60 and 60" in combination with the phase masks 120 and 120" provide the corresponding displacement measurement signals, while as the readhead moves along the measurement axis 83, the readhead portion 60' in combination with the phase masks 120' provides the corresponding displacement measurement signals. As noted above, the optical receiver channels 190a, 190b, and 190c, corresponding to each of the phase masks 120a, 120b, and 120c, show approximately identical sinusoidal intensity variations as the 2D scale 90 moves along the corresponding measuring axis 82. Well known methods are available for determining the displacement of the scale 90 relative to the phase masks 120a, 120b and 120c based on such "three-phase" displacement signals. One exemplary method is described in the previously incorporated '312 application. In particular, in one exemplary embodiment of the present invention, the three optical signals 191a, 191b and 191c of the readhead portion 60 can be processed by the exemplary method described in the '312 application to determine two derived quadrature signal values $Q_1$ and $Q_2$. More generally, each of the three optical signals from each of the readhead portions 60, 60' and 60" can be similarly processed to yield respective derived quadrature signal values $Q_{1i}$, and $Q_{2i}$, where i is a subscript corresponding to the particular readhead portion that is being analyzed. In the following discussion, for example, i=1 for readhead portion 60, i=2 for readhead portion 60', and i=3 for readhead portion 60". In each case, the two derived quadrature signal values $Q_{1i}$ and $Q_{2i}$ can be processed to determine a current phase position $\phi_i$ within a respective wavelength or period of the 2D scale pattern PAT using a two-argument arctangent function that is modulo $2\pi$:

$$\phi_i = a\tan 2(Q_{1i}, Q_{2i}) \qquad \text{(Eq. 3)}$$

The two-argument "a tan 2" function shown in EQUATION 3 is available and described in a number of publicly available mathematical programs. The function result is the arctangent of $Q_1/Q_2$, in radians. However, the use of two arguments allows the determination of the quadrant of the resulting angle, so that the result is between –pi and +pi rather than –pi/2 and +pi/2. Along each respective measuring axis, the 2D scale 90 and the respective readhead portion(s) can be used to provide a position measurement within one respective wavelength or period of the 2D scale 90 by multiplying the respective wavelength by the current respective phase position $\phi_1$. During displacement, the number of accumulated wavelengths can be counted by known methods to provide displacement and/or position measurements over a long-range. In one exemplary embodiment, the respective wavelengths of the 2D scale 90 are each equal to 8.00 microns. In various other exemplary embodiments, each respective wavelength of the 2D scale 90 is chosen within a range of approximately 4 to approximately 40 microns. In various exemplary embodiments, the respective wavelengths are not equal.

Thus, the exemplary 2D fiber optic readhead arrangement 20a shown in FIG. 4 provides a two-dimensional displacement measuring system usable in a variety of 2D fiber optic readheads according to this invention. It will also be appreciated by one of ordinary skill in the art that the reflective 2D fiber optic readhead arrangement shown in FIG. 4 has a transmissive 2D fiber optic readhead arrangement counterpart. In such a case, the light source 280 is located along the Z axis at the same distance on the opposite side of a transmissive scale, at a similar source gap between the light source 280 and the scale.

The exemplary absolute position fiber optic readhead arrangement 20a provides a three-phase measurement system. However, it will be appreciated that alternative embodiments of the phase masks 120, along with corresponding alternative arrangements of the optical receiver channels 190, as described in the incorporated '312 application, are usable in the generic fiber optic readhead arrangement 20a.

FIG. 5 shows a block diagram including a generic remote electronic interface unit 405 that is usable in conjunction with a 2D fiber optic readhead according to this invention, generically represented by a 2D fiber optic readhead 400. The remote electronic interface unit 405 includes a signal processing and control unit 493, a light source 477 that may include an optional lens, and an embodiment-specific plurality of photosensor/amps 492A to 492n, 492A' to 492n' and 492A" to 492n". The light source/lens 477 may include other optics such as optical isolators or the like. The light source/lens 477 and the photosensor/amps 492A to 492n are coupled to the readhead portion 60 of the 2D fiber optic readhead 400 through light source optical fiber 470 and receiver optical fibers 430A to 430n, respectively. Similarly, the light source/lens 477 and the photosensor/amps 492A' to 492n' are coupled to the readhead portion 60' of the 2D fiber optic readhead 400 through the light source optical fiber 470' and the receiver optical fibers 430A' to 430n', respectively, and the light source/lens 477 and the photosensor/amps 492A" to 492n" are coupled to the readhead portion 60" of the 2D fiber optic readhead 400 through the light source optical fiber 470" and the receiver optical fibers 430A" to 430n", respectively. While the light source/lens 477 is illustrated as a single unit, in various embodiments a plurality of separate light sources/lens are provided. In particular, in various embodiments disclosed herein where different readhead portions use different respective illumination wavelengths, a separate light sources/lens is provided for each different wavelength. In various other exemplary embodiments, the light source/lens 477 may include one or more individual light source components or a light source array, one per light source fiber, or a single light source that is distributed into multiple fibers either directly or after being initially input into a single fiber that feeds into "split" fibers. In various exemplary embodiments, at least the light source optical fibers 470 which provide light to the "self-image" readhead portions are single mode optical fibers, which provides improved illumination distribution stability despite potential bending and movement of the readhead cable.

The optical fibers may be routed within a readhead cable (not shown) that gathers and protects the optical fibers between the 2D fiber optic readhead 400 and the remote electronic interface unit 405. A single readhead cable or multiple readhead cables may be used. In various exemplary embodiments according to this invention, the readhead cable may be several meters long or more. The receiver optical fibers 430A to 430n carry the optical signals 491A to 491n, respectively. The optical signals 491A to 491n are phase signals provided as described above and further below. Similarly, the receiver optical fibers 430A' to 430n', carry the optical signals 491A' to 491n', respectively, and the receiver optical fibers 430A" to 430n" carry the optical signals 491A" to 491n", respectively.

The light source/lens 477 receives power and may receive gain control signals from the signal processing and control unit 493. As described above, the light source/lens 477 transmits light through the source optical fibers 470, 470' and 470" to the 2D fiber optic readhead 400 and onto the scale grating pattern of the scale 90. The fiber optic detector channels of the 2D fiber optic readhead 400, such as the fiber optic receiver channels 190a to 190c described above, or the like, receive light from the scale grating pattern of the scale 90 and provide the signals 491A to 491n, which are input to the photosensor/amps 492A to 492n, respectively. The photosensor/amps 492A to 492n provide amplified electronic output signals 491Ax to 491nx to the signal processing and control unit 493. Similarly, the photosensor/amps 492A' to 492n' provide amplified electronic output signals 491Ax' to 491nx' to the signal processing and control unit 493, and the photosensor/amps 492A" to 491n" provide amplified electronic output signals 491Ax" to 491nx" to the signal processing and control unit 493. In various exemplary embodiments, the signal processing and control unit 493 then determine a position according to the equations and teachings outlined above.

It will be appreciated that in various exemplary embodiments described further below, an optical fiber readhead according to this invention may provide a plurality of optical fiber receiver channels carrying optical signals that are summed. For such embodiments, fibers carrying the optical signals that are summed can interface to the same photosensor/amp 492 in order to provide the desired signal summing, or to different photosensor/amps 492 which have their the signals summed electronically during additional signal processing. It will be appreciated that in various other exemplary embodiments described further below, an optical fiber readhead according to this invention may provide an additional one or more readhead portions including an additional plurality of optical fiber receiver channels. For such embodiments, the additional fibers carrying the corresponding optical signals can interface by similar additional connections to a light source/lens 477 and similar photosensors/amps 492 in order to provide the desired signals for signal processing. Thus the configuration shown in FIG. 5 is intended to be illustrative only and not limiting.

Figure 6:
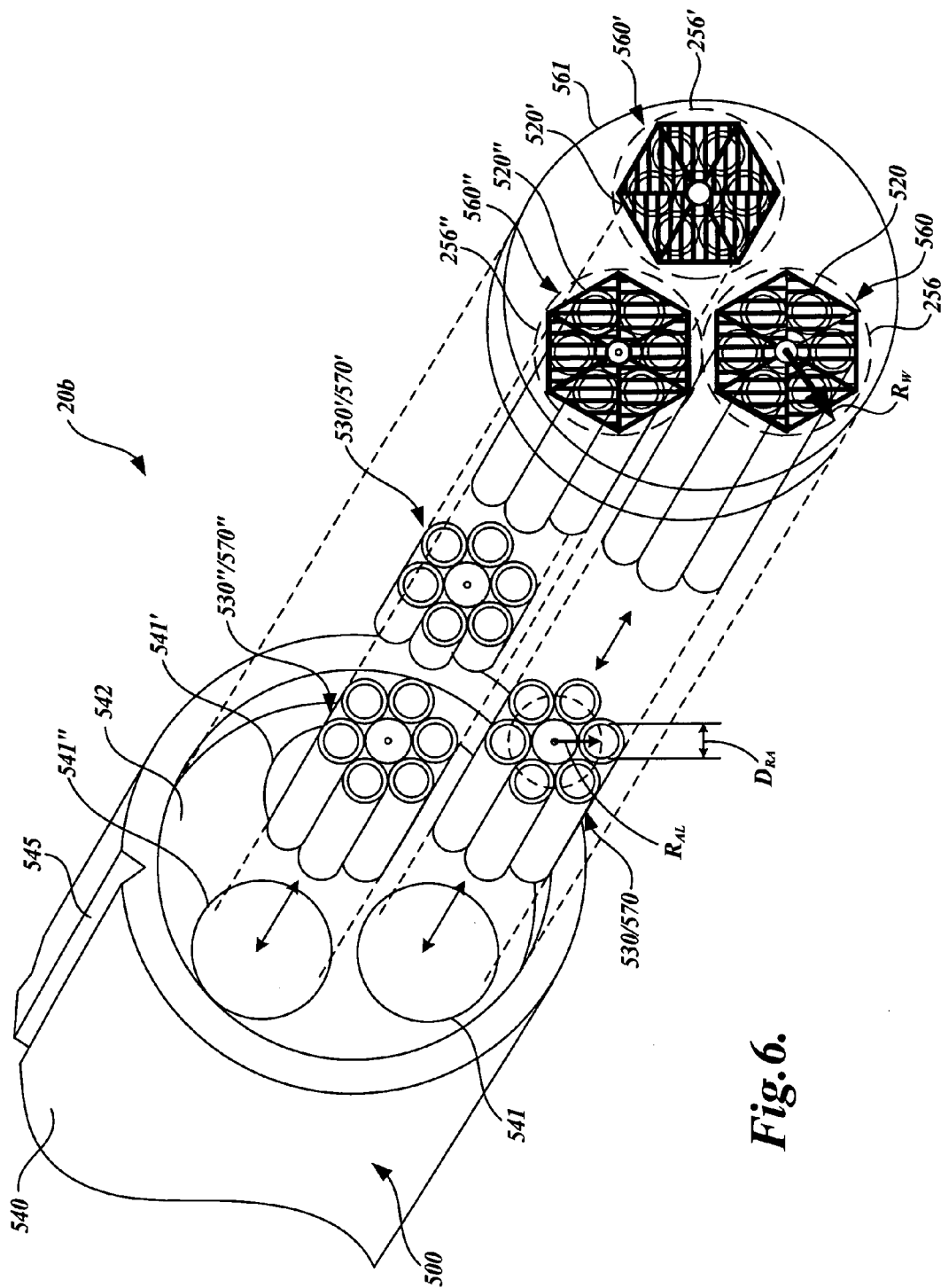
FIG. 6 is a partially exploded isometric view of a third generic embodiment of a 2D fiber optic readhead arrangement according to this invention.
Figure 7:
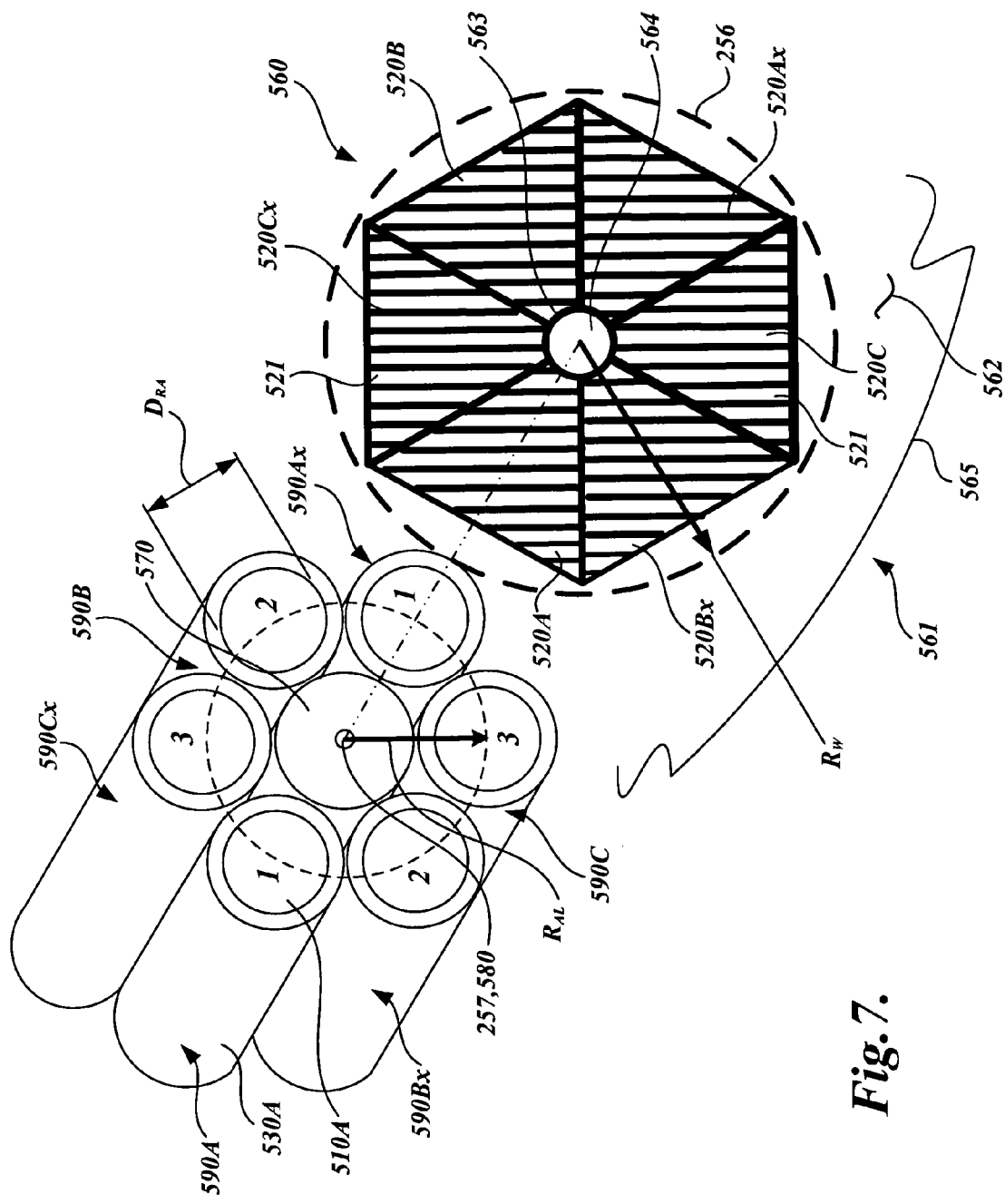
FIG. 7 is a partially exploded isometric view of the fiber and mask arrangement of one of the readhead portions of the 2D fiber optic readhead arrangement of FIG. 6.

FIGS. 6 and 7 show a third exemplary embodiment of a 2D fiber optic readhead arrangement 20b according to this invention. The 2D fiber optic readhead arrangement 20b operates substantially similarly to the generic 2D fiber optic readhead arrangement 20a described above with reference to FIG. 4, and includes similar components. Due to these similarities in configuration and operation, only certain aspects of the 2D fiber optic readhead arrangement 20b that require additional explanation are described below.

As shown in FIGS. 6 and 7, the 2D fiber optic readhead arrangement 20b includes readhead portions 560, 560' and 560". As best shown in FIG. 7, the readhead portion 560 includes a first set of three fiber optic receiver channels 590A–590C, which operate similarly to the previously described fiber optic receiver channels 190. It should be appreciated that the 2D fiber optic readhead arrangement 20b provides a first example of a "balanced pair" 2D fiber optic readhead portion according to this invention. To provide a balanced pair 2D fiber optic readhead portion according to this invention, each readhead portion 560–560" includes a second set of three respective balanced fiber optic receiver channels 590Ax–590Cx that are respectively arranged in "balanced pairs" on opposite sides of the illumination field center 257 from the respective fiber optic receiver channels 590A–590C as shown. The pairs of numbers 1-1, 2-2, and 3-3 shown on the optical fiber receiver apertures 510 in FIG. 7 are indicative of the balanced pairs.

As shown in FIG. 6, a readhead housing 500 includes a cylindrical ferrule 540 with an alignment groove 545. The inner diameter of the ferrule includes three holes 541 which fit with a slight interference fit over the close-packed peripheral optical receiver fibers 530 and central optical source fiber 570 of each of the three respective readhead portions 560. In one exemplary assembly method, the fibers with prepared flat ends are aligned and inserted in the ferrule 540 from the back end and inserted until they protrude slightly beyond a mounting surface 542. Then, the respective phase mask sets 520, 520' and 520" carried on the phase mask element 561 are aligned to the fiber ends under a microscope, pushed against the fiber ends to make them coplanar with the mounting surface 542 and bonded tight to the mounting surface 542. The fibers are then bonded to the ferrule and each other. Alternatively, the mounting surface 542 is made flush with the end of the ferrule 540 and the fibers with prepared flat ends are aligned and inserted in the ferrule 540 from the back end and inserted until they protrude slightly beyond the mounting surface 542. Then, adhesive is placed around the end of the fibers to provide support and to fix the fibers to the ferrule 540. Then the fibers and adhesive are fine ground and/or polished back to flush or nearly flush with the mounting surface 542. Then, the respective phase mask sets 520, 520' and 520" carried on the phase mask element 561 are aligned to the fiber ends under a microscope, pushed against the fiber ends and bonded tight to the mounting surface 542.

In one exemplary embodiment, the phase masks sets 520 are fabricated on the "inside" of the phase mask element 561, nearest the fiber ends. A light source 580 is provided by the end of a source fiber 570. In one exemplary embodiment, the source fiber 570 is a single mode fiber used as a point source for emitting light at a source wavelength of 635 nm, and is the optical fiber part number FS-SN-3224 made by 3M Corporation, that has an outer diameter of $D_{SF}=250$ microns. The receiver optical fibers 530 are all the same commercially available multimode fiber that is a silica fiber with 200/220/250 micron core/cladding/buffer diameters $D_{RA}/D_{RC}/D_{RF}$. Thus, all of the source and receiver fibers in the 2D fiber optic readhead arrangement 20b have the same 250 micron outer diameter and can therefore be arranged in an advantageous close packing assembly arrangement according to this invention that allows both highly accurate and economical precision alignment and assembly. In this exemplary embodiment, the advantageous close packing assembly arrangement is a hexagonal close packing assembly arrangement.

Each of the receiver optical fibers 530 and the source fiber 570 have a cladding and a core. The cladding is represented by the outer circles, and the core is represented by the inner circles. It can be seen that in the embodiment shown in FIG. 7, the source fiber 570 has a relatively small core, with reference to the outer diameter of its cladding. In contrast, the receiver optical fibers, as represented by fiber 530A, have a relatively large core relative to the outer diameter of their cladding.

It will be appreciated that in comparison to the 3-fiber receiver arrangement used in the readhead portions of the 2D fiber optic readhead arrangement 20a shown in FIG. 4, the balanced 6-fiber receiver arrangement of the readhead portions of this embodiment 20b provides twice as much received light, and therefore twice the potential signal strength. Furthermore, the balanced pair arrangement of the receiver apertures 510 rejects certain errors due to readhead misalignment to further increase measurement accuracy, as described in the incorporated '312 application.

It should be appreciated that an assembly such as the 2D fiber optic readhead arrangement 20b provides a high resolution all optical encoder readhead where each of the readhead portions 560 has a diameter of 1.0 mm or less. It should be appreciated further that the arrangement provides low-cost precision "self-assembly". It should also be appreciated that the source fiber 570 is intentionally "oversized" solely for these assembly purposes. The 2D fiber optic readhead arrangement 20b also provides a relatively high S/N ratio according to the design principles that will be discussed below with respect to FIG. 8.

For example, in one specific exemplary embodiment, for a flat end of the exemplary optical fiber part number FS-SN-3224 made by 3M Corporation as described above, it has been determined that the divergence half-angle for the "half-maximum" beam radius is approximately 4.5 degrees. Thus, in one exemplary embodiment of the 2D fiber optic readhead arrangement 20b, for a scale 90 with a reflective scale and a self-imaging gap of approximately 1.6 mm, the radius $R_W$ of the illumination field 256 is approximately equal to tan(4.5)*2*1.6 mm=253 microns. For the exemplary optical fiber characteristics and dimensions described above and a close-packing embodiment of the 2D fiber optic readhead arrangement 20b, the location radius $R_{AL}$ of the receiver apertures 510 is approximately equal to 250 microns. Thus, $R_W$ approximately equals $R_{AL}$ and is not far from the value of $0.83*R_{AL}$ as will be discussed in more detail below with reference to FIG. 8. Furthermore, the receiver aperture diameter $D_{RA}$ of the receiver apertures 510 is $D_{RA}$=200 microns, which is approximately $\frac{4}{5}*R_{AL}$. According to the information that will be outlined with reference to FIG. 8, with such design relationships, each optical fiber receiver channel should provide a relative S/N ratio that approaches the maximum obtainable value. Experimentally, the inventor has demonstrated stable position readings with a comparable readhead arrangement of this type at a resolution of 1 nanometer using a 1D scale having an 8 micron grating pitch.

It should be appreciated that this exemplary embodiment is illustrative only, and not limiting. More generally, source fibers may be prepared or selected to provide a divergence half-angle for the "half-maximum" beam radius from a range of approximately 2 to 10 degrees or more, and the design of corresponding readheads may be chosen according to the principles of this invention and as disclosed in the incorporated '312 application.

It should be appreciated that the dimensions described for the foregoing exemplary embodiment can provide a fiber optic readhead arrangement where substantially all of the illumination energy in each illumination field 256 is located within a circle having a radius (of approximately $2.55*R_W$) that is significantly less than the dimension of at least one operable self-imaging gap. It should also be appreciated that the dimensions described for the foregoing exemplary embodiment can provide a fiber optic readhead arrangement where each receiver fiber aperture 510 is spaced apart from the center of a corresponding illumination field 256 (the center coinciding with a scale light axis 256) by a location radius $R_{AL}$ that is significantly less than the dimension of at least one operable self-imaging gap. Such design relations emphasize the compact size achievable for a high-resolution self-imaging readhead portion according to the present invention, which enables the width and height or diameter for a high resolution absolute fiber optic readhead arrangement according to this invention to approach a few times the operating gap dimension or even less. Such compact dimensions allow a readhead arrangement according to this invention to operate and travel in an operating volume that is a fraction of the operating and traveling volume required for previously known readheads having comparable performance features and robustness. Such previously known readheads typically have width and height dimensions that are many times their operating gap dimension, which limits their potential utility, economy, and convenience in many applications.

As shown in FIG. 7, for each readhead portion 560 the phase mask element 561 includes a phase masks set 520 which includes the phase masks 520A–520C and 520Ax–520Cx. Each of the phase masks 520A–520C and 520Ax–520Cx includes grating bars 521, also called spatial filtering bars herein, that are opaque to a readhead source light. The grating bars 521 are arrayed on the surface 562 of a substrate 565 that is transparent to the readhead source light. Chrome, copper, and oxides thereof are common materials that may be used for patterning the grating bars 521. Glass and quartz are common substrate materials that may be used for the substrate 565. The active mask area of each of the phase masks 520A–520C and 520Ax–520Cx is the area containing the grating bars 521. This active mask area should be of sufficient size to cover the clear aperture area of the corresponding receiver apertures 510 with extra tolerance for variations in assembly positioning. Shown at the center of the mask element 561 is an alignment ring 563 having a clear aperture 564 for the source light from the optical fiber 570, discussed above. The size of the clear aperture is, for example, several times greater than the single-mode core diameter, which is on the order of $D_{SA}$=4 microns. In one exemplary embodiment the phase mask element 561 is made of soda lime glass, has a thickness of 0.25 mm and a diameter that is matched to the corresponding inner diameter of the ferrule 540 (see FIG. 4).

The mask grating bars 521 are arranged periodically along either the X-axis direction (for readhead portions 560 and 560") or along the Y-axis direction (for readhead portion 560') according to a period that matches that of the grating image in the operable self-image plane, as previously described. The exemplary phase mask element 561 as shown has six phase masks in each phase mask set 520 for use with six fiber optic receiver channels in a balanced configuration where diametrically opposing fiber optic receiver apertures receive the same phase of light signal modulation with movement of the readhead relative to the scale. The phase masks have spatial phases of 0 degrees (520A and 520Ax), 120 degrees (520B and 520Bx), and 240 degrees (520C and 520Cx). The boundary between the various phase masks 520 is easily visible under a microscope for a phase mask element constructed with grating bars 521 usable in a self-image encoder. These can be used to align the phase mask element 561 relative to the receiver fibers. The inventor has found that alignments within tolerances less than 20 microns and even less than 10 microns are easily achievable using a microscope and an XYZ micrometer stage to position the phase mask element 561 relative to the receiver fibers.

The following discussion is relevant to the results described with reference to FIG. 8, further below. It should be appreciated that optical fiber readheads according to the present invention can be ultra-miniature readheads. It should be appreciated that in contrast with the relatively crude optical fiber encoder readheads that do not use self-imaging and/or that are not designed to provide high resolution and high accuracy position measurement signals, both the size and inherent signal to noise ratio of such optical fiber encoder readheads are critical. Design constraints such as a desired or economical fiber size, practical illumination field sizes obtained directly from optical fiber sources at specific self-imaging gaps, and practical assembly positioning constraints are all important design considerations. In particular, it should be appreciated that the small receiving aperture diameter that is provided by many optical fibers usable according to this invention may be much smaller than most or all electronic detectors used in prior art readheads, and that such a small receiving aperture diameter severely constrains the available signal energy and the resulting signal to noise ratio.

For all of these reasons, it is important to observe certain design relationships related to providing an adequate signal to noise ratio in light of these severe design constraints. Such design relationships not only indicate the design conditions related to optimum performance, but also indicate a range where design tradeoffs may be made for the sake of assembly techniques, component cost, or other reasons, while still retaining micron-level or even sub-micron level resolution and accuracy. As discussed in more detail below, certain design factors for optical fiber encoder readheads can be used to provide a desirable signal to noise ratio in various exemplary optical fiber encoder readhead embodiments according to this invention.

In various exemplary embodiments, a light source usable according to this invention is a fiber optic light source without a separate lens or collimator. In various exemplary embodiments, such a fiber optic light source outputs a diverging source light beam from its end, the diverging light beam typically having a divergence half angle in the range of 4.5 to 10 degrees. It is reasonable to assume a Gaussian intensity distribution in such a source light beam. The properties of Gaussian beam distributions are well described in texts on the applications of optical fibers. This Gaussian intensity profile is an important consideration in a 2D fiber optic readhead arrangement according to this invention, for a number of reasons. It should be appreciated that the illuminance in such a beam, that is, the useful flux per unit of cross sectional area, is concentrated disproportionately along the beam axis. Thus, a receiver aperture positioned away from the beam axis suffers "extra" signal loss (compared to a "uniform beam assumption") due to the Gaussian distribution. In addition, it should be appreciated that, just as in a uniform beam, the average beam illuminance will decrease due to purely geometric factors whenever the radius of a spot size or illumination field of the beam is increased, due to "divergence loss". Also, it should be appreciated that in an "aligned" reflective configuration, such as those shown in FIG. 4, with a Gaussian beam the highest illuminance in the illumination field 265 is on and surrounding the illumination field center 257. However, mechanical interference with the light source 280 and various other assembly considerations may prohibit locating the receiver apertures 110 in that region of highest illuminance.

The following equation, EQUATION 4, takes the factors discussed above into account in the variable D. In addition, the equation includes other important factors to provide a useful analysis of the dependence of the signal to noise ratio on various design factors in a 2D fiber optic readhead arrangement according to this invention:

$$S \approx PC_{g_1 g_2} DR_d G_d \qquad (Eq.\ 4)$$

Figure 8:
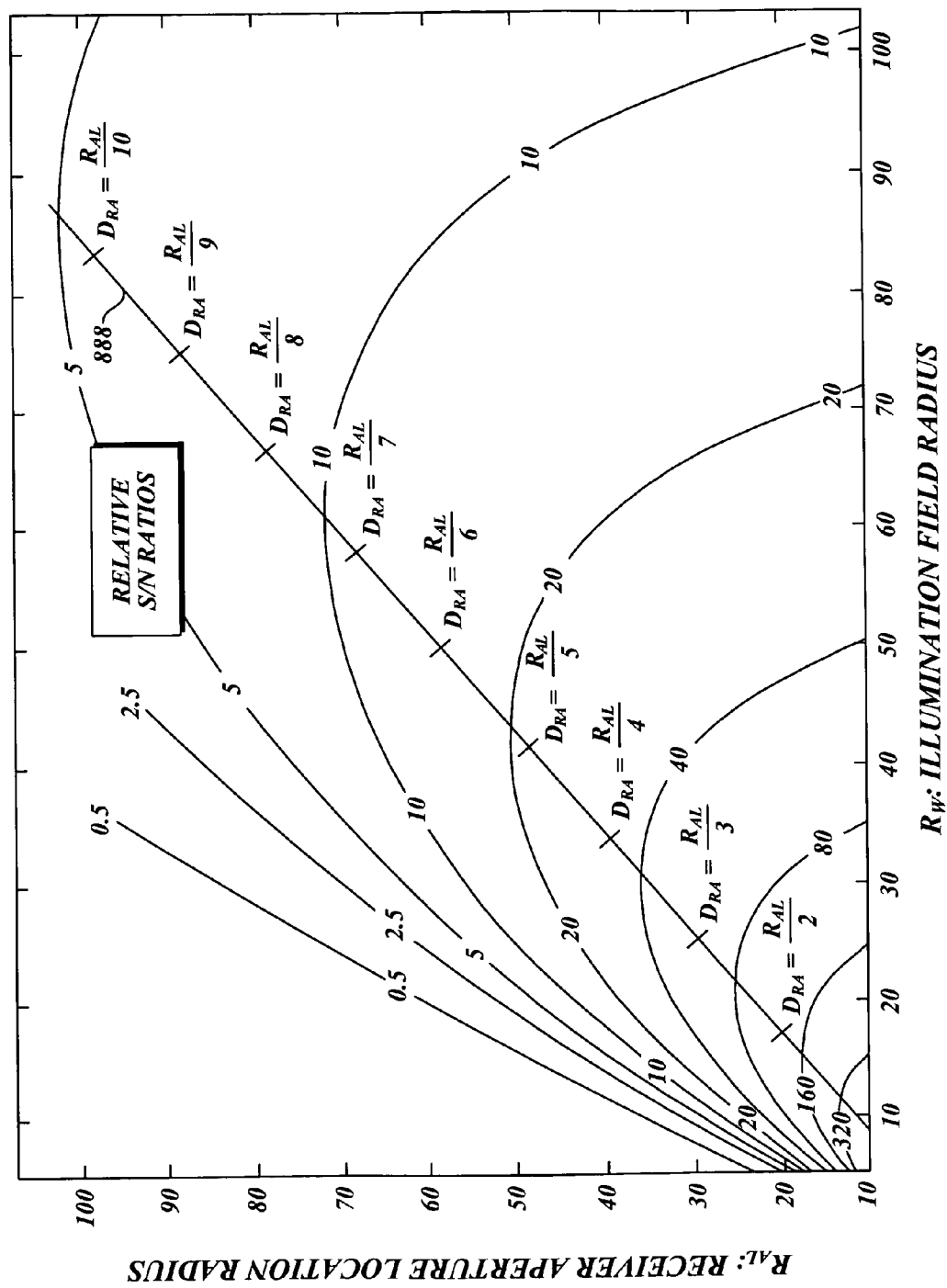
FIG. 8 is a diagram showing representative relative signal-to-noise ratios that result for various receiver aperture diameters when the receiver aperture of a fiber optic detector channel is positioned at various radii from the center of an illumination field, for a 2D fiber optic readhead portion arrangement approximately corresponding to FIGS. 1, 2, 3, 4, 6 and 7.

The following table defines the symbols used in EQUATION 4, and also includes typical values used to determine the results shown on FIG. 8, where applicable.

TABLE 1

| Symbol | Description | Value |
|---|---|---|
| S | Signal Power | Dependent, result |
| P | Laser Power (see FIG. 4) | 20 mW |
| C | Fiber Coupling interface loss | 0.9 |
| $g_1$ | Scale Efficiency (reflection loss) | 0.25 |
| $g_2$ | Phase Mask loss (filtering) | 0.8 |
| D | Divergence loss: Geometric effects including Gaussian beam effects. | Dependent: as described above |
| $R_d \times G_d$ | Photodetector and Preamp: Responsivity × Gain (see FIG. 4) | 16 V/mW |

A value of 0.05 mV may be taken as a typical electronic system noise in a suitable 2D fiber optic readhead signal processing remote electronics, such as that shown in FIG. 5.

FIG. 8 is a diagram showing representative relative signal to noise ratios that result for various receiver aperture diameters $D_{RA}$ when the receiver aperture of a fiber optic detector channel is positioned at various receiver aperture location radii $R_{AL}$ from the center of an illumination field, approximately corresponding to the generic 2D fiber optic readhead arrangement described above with reference to FIG. 3. The illumination field radius $R_W$, shown on the horizontal axis in FIG. 8, is comparable to the radius of an illumination field such as the illumination field 256 described above. For a Gaussian beam profile, the edge of the beam or the resulting illumination field is not well defined. In this case, $R_W$ is defined as the radius in the illumination field where the local beam intensity is one-half the local intensity at the illumination field center. According to this definition, there is significant illuminance beyond the radius $R_W$, but 99% of the total beam energy falls within a radius of approximately 2.55 $R_W$. The receiver aperture location radius $R_{AL}$, shown on the vertical axis in FIG. 8, and the receiver aperture diameter $D_{RA}$ shown at various locations in FIG. 8 have been previously defined with reference to FIGS. 6 and 7.

It should be appreciated that the results of FIG. 8 depend on the ratios between various dimensions, not the particular dimensions themselves. Therefore, the length unit used for the axes shown in FIG. 8 is arbitrary. The ratios become meaningful in design, when one element of the ratio is selected or constrained to a particular dimension for various reasons. Then the particular dimension of the complementary factor can be chosen accordingly. The line 888 includes reference marks and corresponding labels for various receiver aperture diameter values $D_{RA}$. To preserve the generality of FIG. 8, the receiver aperture diameter values $D_{RA}$ are given as a proportion of their corresponding receiver aperture location radius $R_{AL}$.

It should be appreciated that because the S/N ratios shown in FIG. 8 are relative S/N ratios, FIG. 8 can be taken to reflect the relative S/N ratio behavior for a single "ideal" detector channel, or for an optically combined "balanced pair" of detector channels, or the like. That is, while a different set of estimated design values and/or assumptions, such as a lower laser power, a higher noise value, or optically combining 2 or more receiver channel signals, will affect the quantitative values of an estimated S/N ratio, each set of assumptions will affect each assumed signal in approximately the same manner. Thus, the qualitative or relative S/N ratios shown at various locations throughout FIG. 8 remain valid design guides for making reasonable relative design choices and tradeoffs, even when the design values outlined above are varied. It should also be appreciated that the actual position determination results from a readhead according to this invention may also be degraded by a great number of other factors such as the balance between various phase signals, spatial harmonics in the phase signals, contamination, misalignment and the like. Furthermore, in a readhead with multiple readhead portions according to the principles of this invention, according to practical and economical design choices, as described above, a single light source/lens 477 may be used for 2 or more readhead portions. This divides the available laser power (as shown in Table 1, for example) among the various readhead portions, lowering the signal to noise ratio. Nevertheless, the relative S/N ratios shown in FIG. 8 provide very useful design guidelines, especially for determining the relative performance potential of various design tradeoffs in various reasonable and similar designs. It should be appreciated that one of ordinary skill in the art can perform suitable readhead experiments to verify a quantitative S/N ratio corresponding to a particular location in FIG. 8, and then scale that result using the relative S/N ratios of FIG. 8 to approximately estimate quantitative results associated with other "design regions" in FIG. 8. For example, the inventor has experimentally demonstrated stable position readings at a resolution of 1 nanometer using a scale having an 8 micron grating pitch with a balanced pair arrangement of the receiver apertures where the receiver aperture diameter $D_{RA}$ is approximately equal to the receiver aperture location radius $R_{AL}$. This is indicative that a readhead designed according to the principles of this invention can produce a signal to noise ratio that is quantitatively very high, in this "design region" of FIG. 8. Furthermore, importantly, based on such an experimental results and FIG. 8, one may estimate the approximate relative quantitative performance of a various other similar readhead designs according to this invention, where the design factors correspond to other design regions in FIG. 8.

In FIG. 8 various relative S/N ratio results are shown along various relative S/N ratio "isocurves", for various combinations of values of $R_W$ and $R_{AL}$. On each relative S/N isocurve there is a "peak" corresponding to the maximum value for $R_{AL}$ that is usable to obtain the relative S/N ratio of that relative S/N isocurve. Each relative S/N isocurve peak shown in FIG. 8 corresponding to the "maximum value" for the receiver aperture location radius $R_{AL}$, occurs at the illumination field radius $R_W$ which is optimum for that particular value of $R_{AL}$. The line 888 runs through all such relative S/N isocurve peaks. It should be appreciated that any particular receiver aperture location radius $R_{AL}$ (a horizontal line in FIG. 8) intersects with a corresponding point on the line 888. Any deviation of the illumination field radius $R_W$ (a vertical line in FIG. 8) that corresponds to that same point on the line 888 will produce a lower relative S/N ratio and worse performance for that particular receiver aperture location radius $R_{AL}$.

It should appreciated that to provide high resolution and accuracy based on the sinusoidal signals provided by an a 2D fiber optic readhead according to this invention, it is desirable not only to count the number of wavelengths or scale pitch units accumulated, it is also desirable to interpolate within the "initial" and "most recent" wavelength to as high a degree as possible. Generally, for the fiber optic self-imaging readheads disclosed in the incorporated '312 application and herein, high quality sinusoidal signals are provided and the interpolation level corresponds roughly to the S/N ratio. That is, with a S/N ratio of 1000, approximately $1/1000^{th}$ of the peak-to-peak sinusoidal signal may potentially be discriminated. Considering that the inventor has experimentally demonstrated stable position readings at a resolution of 1 nanometer using a 1D scale having an 8 micron grating pitch, even considering the additional signal strength reduction expected from a 2D scale and the known sources of error that are to arise in the sinusoidal signals of practically-applied self-imaging readheads, the experimental performance described above corresponds to sinusoidal signal variations that vary from an ideal sinusoidal variation by a ratio of at most $1/64$ of the peak-to-peak variation of those sinusoidal signals. It should be appreciated that for the readheads disclosed herein, such performance allows design tradeoffs related to component choice, cost reduction, or manufacturability or the like, which according to FIG. 8 may reduce the S/N ratio, yet still result in desirable absolute measurement readheads. In such embodiments, the sinusoidal signal variations may vary from an ideal sinusoidal variation by a ratio of up to $1/32$, or even up to $1/16$, of the peak-to-peak variation of those sinusoidal signals and still result in a useful miniature 2D fiber optic readhead according to the principles of this invention.

The relative S/N ratio results shown in FIG. 8, based on the previously described assumptions and design values, indicate that regardless of the receiver aperture diameter $D_{RA}$, for a given receiver aperture location radius $R_{AL}$ the best "half-maximum" illumination field radius $R_W$ is approximately equal to $0.83*R_{AL}$. FIG. 8 further indicates that reducing the "half-maximum" illumination field radius $R_W$ to approximately $0.5*R_{AL}$, or increasing the "half-maximum" illumination field radius $R_W$ to approximately $1.7*R_{AL}$, produces a relative S/N ratio that is approximately one-half of that provided at $0.83*R_{AL}$, which is a significant and undesirable reduction of the S/N ratio in various exemplary embodiments according to this invention. Thus, in various exemplary embodiments according to this invention, the "half-maximum" illumination field radius $R_W$ is equal to at least $0.5*R_{AL}$ and equal to at most $1.7*R_{AL}$. Alternatively, since 99% of the total beam energy falls within a radius of approximately $2.55\ R_W$ as previously indicated, this same design relationship may also be expressed as follows: In various exemplary embodiments according to this invention, 99% of the total beam energy falls within a total illumination field radius at the operable self imaging plane and/or phase mask plane, where the total illumination field radius is equal to at least $0.5*R_{AL}*200.55$, that is, approximately $1.28*R_{AL}$ and equal to at most $1.7*R_{AL}*2.55$, that is, approximately $4.4*R_{AL}$. However, it should be appreciated that in various other exemplary embodiments, a self-imaging 2D fiber optic readhead according to this invention retains various advantages even when the receiver illumination field radius $R_W$ is less than $0.5*R_{AL}$ or more than $1.7*R_{AL}$. For example, particularly advantageous assembly methods and small size are possible with a self-imaging 2D fiber optic readhead according to this invention, as described further below.

The results shown in FIG. 8 also indicate the relative S/N ratio effect of the receiver aperture diameter $D_{RA}$ in relation to a receiver aperture location radius $R_{AL}$. It should be appreciated that according to the assumptions and definitions used herein, a receiver aperture location radius $R_{AL}$ will not generally be less than one-half $D_{RA}$. Furthermore, for a close packing assembly arrangement using a source fiber that is the same diameter as the receiver fibers, such as shown in FIGS. 6 and 7, the receiver aperture location radius $R_{AL}$ is approximately equal to $D_{RA}$. As shown along the line 888, a relative S/N ratio greater than 320 is indicated where the receiver aperture diameter $D_{RA}$ approaches a value approximately equal to the receiver aperture location radius $R_{AL}$. As previously discussed, experimentally, the inventor has demonstrated stable position readings at a resolution of 1 nanometer using a 1D scale having an 8 micron grating pitch with a readhead arrangement where the receiver aperture diameter $D_{RA}$ is approximately equal to the receiver aperture location radius $R_{AL}$. Thus, even given the expected reduction in signal strength due to a 2D scale in comparison to a 1D scale, it is reasonable that when using such a readhead arrangement in combination with a 2D scale, a resolution on the order to 2 nanometers is achievable.

As shown along the line 888, when the ratio of the receiver aperture diameter $D_{RA}$ to the receiver aperture location radius $R_{AL}$ is reduced to approximately ⅓, a relative S/N ratio a little greater than 50 is provided according to the assumptions used to determine the results shown in FIG. 8, that is, the relative S/N ratio is at least 6 times worse than when the receiver aperture diameter $D_{RA}$ approaches a value approximately equal to the receiver aperture location radius $R_{AL}$. It should be appreciated that for configurations with relatively lower signal to noise ratios, accurate interpolation levels are reduced. In various exemplary embodiments according to this invention, it is undesirable to settle for poorer levels of potential performance. Thus, in various exemplary embodiments according to this invention, a receiver aperture diameter $D_{RA}$ should be greater than or equal to ⅓ of that receiver aperture's location radius $R_{AL}$.

As shown along the line 888, when the ratio of the receiver aperture diameter $D_{RA}$ to the receiver aperture location radius $R_{AL}$ drops further to approximately ⅕, the relative S/N ratio drops by an additional factor of approximately 2. That is, as the ratio $D_{RA}/R_{AL}$ drops from ⅓ to ⅕, the potential performance in a 2D fiber optic readhead according to this invention drops by a factor of approximately 2. However, relaxing the $D_{RA}/R_{AL}$ ratio to this level may allow useful design flexibility and/or more economical components or assembly, while still allowing sub-micron-level performance along with the miniature size and various other advantages available with a self-imaging 2D fiber optic readhead according to this invention. Therefore, in various other exemplary embodiments according to this invention, a receiver aperture diameter $D_{RA}$ should be greater than or equal to ⅕ of that receiver aperture's location radius $R_{AL}$.

As the ratio $D_{RA}/R_{AL}$ drops further from ⅕ to ⅛, the relative S/N ratio drops by a further factor of approximately 2 to 3. However, relaxing the $D_{RA}/R_{AL}$ ratio to this level may allow still more useful and economical design and assembly flexibility, while still allowing micron-level performance along with the miniature size and various other advantages available with a self-imaging 2D fiber optic readhead according to this invention. Therefore, in various other exemplary embodiments according to this invention, a receiver aperture diameter $D_{RA}$ should be greater than or equal to ⅛ of that receiver aperture's location radius $R_{AL}$.

When the receiver aperture diameter $D_{RA}$ drops to less than ⅛ of that receiver aperture's location radius $R_{AL}$, the performance potential of a self-imaging 2D fiber optic readhead according to this invention is in some instances not remarkable compared to other much larger commercially available encoder readheads, but its size remains remarkable in comparison to such encoder readheads. Furthermore, its size, and/or resolution and accuracy, and/or robustness of operation remain remarkable compared to prior art fiber encoders which use other physical or optical principles. Furthermore, particularly advantageous assembly methods are possible with a self-imaging 2D fiber optic readhead according to this invention, as described above and further below. Thus, in various exemplary embodiments, a self-imaging 2D fiber optic readhead according to this invention retains various advantages even when the receiver aperture diameter $D_{RA}$ drops to less than ⅛ of that receiver aperture's location radius $R_{AL}$.

The inventor has also determined that relatively ideal self-images are present only relatively close to the center of an illumination field arising from a light source that is a point source in various exemplary embodiments according to this invention. In such cases, as a receiver aperture's location radius $R_{AL}$ is increased, the available self-image according to this invention exhibits increasingly non-ideal changes in visibility and spatial phase at increasing radius from the center of the illumination field. Indeed, the most widely known references on self-imaging make assumptions that restrict their validity to the center of a self-image illumination field. Thus, without negating the validity of the foregoing discussion regarding relative S/N ratios in a self-imaging 2D fiber optic readhead according to this invention, in various exemplary embodiments, the receiver aperture's location radius $R_{AL}$ is also made as small as other design, assembly and cost tradeoffs allow.

Figure 9:
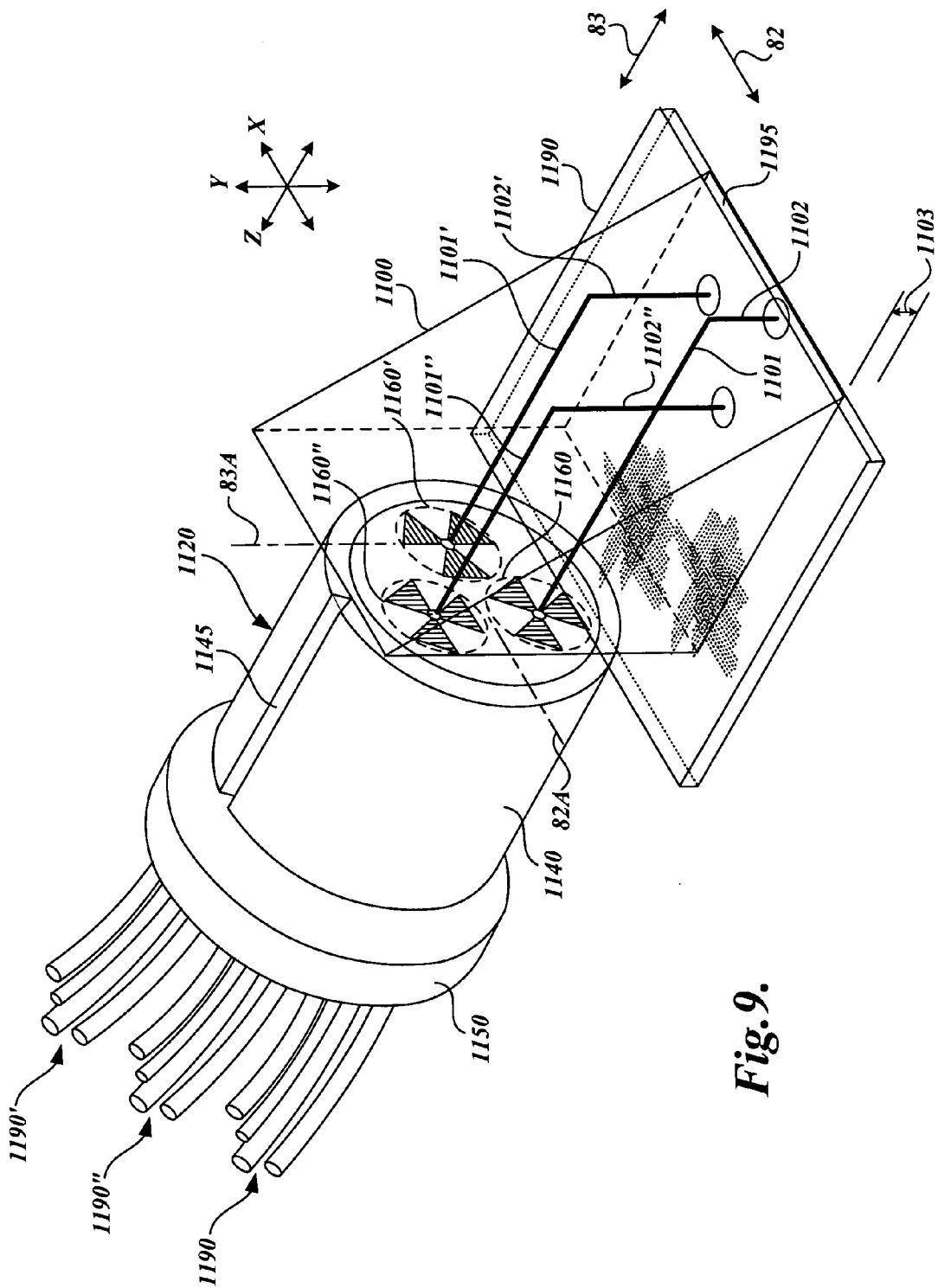
FIG. 9 shows an optical deflector useable in conjunction with various 2D fiber optic readhead arrangements according to this invention.

FIG. 9 shows an optical deflector 1100 usable in conjunction with various 2D fiber optic readheads according to this invention, in one exemplary orientation relative to a 2D scale 1190, which in various exemplary embodiments is the same as the previously described scale 90. As shown in FIG. 9, a generic exemplary optical fiber readhead arrangement 1120, which in various exemplary embodiments is the same as the previously described optical fiber readhead arrangement 20a, includes readhead portions 1160, similar to the optical fiber readhead portions 60 previously described with reference to FIG. 4. The readhead portions 1160 transmit a diverging source light generally along a beam path 1101 to the optical deflector 1100, where it is deflected along a beam path 1102 and through an operating gap 1103 towards the scale 1190. Similarly, scale light reflecting, diverging and diffracting from the scale 1190 is returned to the optical deflector 1100 generally along the beam path 1102 and deflected back towards the readhead portion 1160 generally centered along the nominal beam path 1101. The scale 1190 moves relative to the optical fiber readhead arrangement 1120 and the deflector 1100 along the directions of the measuring axes 82 and 83. The returned scale light provides a self-image of the scale grating 1190 at a self-image plane in an illumination field that is generally centered with respect to the fiber optic receiver channel configuration of the exemplary optical fiber readhead arrangement 1120, as previously described with reference to various other exemplary embodiments according to this invention. It should be appreciated that the grating bars of the phase masks of the exemplary optical fiber readhead arrangement 1120 are oriented such that they are either parallel to the line 82A, that is parallel to the measuring axis 82 (for readhead portion 1160') or else parallel to the line 83A, that is parallel to the measuring axis 83 (for readhead portions 1160 and 1160"). It should also be appreciated that the more accurately the deflector 1100 deflects the beam path 1101 relative to a nominal deflection of 90 degrees to become the beam path 1102, and the more accurately the beam path 1102 is made normal to the surface of the scale 1190, the more accurate and robust will be the resulting position measurement system.

In various exemplary embodiments, the deflector 1100 is a reflecting right angle prism, mirror, or other suitable optical component reliably mounted on a separate member in a fixed relation relative to a 2D fiber optic readhead according to this invention. In order to maintain a short path length operable for self-imaging, and still maintain a practical operating gap relative to the scale grating 1190, the deflector 1100 is preferably mounted as close as possible to the readhead portions 1160. It should be appreciated that in various exemplary embodiments, the deflector 1100 may require an increased total self-imaging distance relative to a readhead configuration without a deflector, which may also relatively increase the total divergence of the light from the light source and scale. Thus, in such cases, care should be taken to adjust the various readhead design parameters to maintain design relationships according to the principles of this invention and as disclosed in the '312 application. In various exemplary embodiments, the deflector 1100 is properly aligned and attached directly to the ferrule 1140. In various other exemplary embodiments, the deflector 1100 may also act as a substrate to provide a phase mask element according to this invention, having phase masks according to this invention formed directly onto the surface of the deflector 1100 that is positioned towards the ferrule 1140.

In the embodiment shown in FIG. 9 the 2D optical fiber readhead arrangement 1120 is oriented with its long axis transverse to the direction of the measuring axis 82 of the scale 1190. Either the ferrule 1140 or the scale 1190 may be fixed in position, with the other element moveable. It will be appreciated that in numerous applications it is practical to use a deflector such as the exemplary deflector 1100 in this manner because of the ultra-miniature size of a 2D fiber optic readhead and encoder according to this invention. It will also be appreciated that in numerous applications a deflector such as the exemplary deflector 1100 further enhances the utility of a 2D fiber optic readhead and encoder according to this invention by allowing the 2D fiber optic readhead to be flexibly oriented relative to the scale 1190 and the directions of the measuring axes 82 and 83, such that the largest and narrowest dimensions of the readhead are oriented in desired directions. It will further be appreciated that use of a deflector such as the exemplary deflector 1100 is beneficial for orienting the route of the optical fibers and/or cables of the readhead arrangement 1120 in desired directions.

It should be appreciated that any of the embodiments shown, described or taught herein can be adapted to provide a 2D measurement system analogous to any of the circular or cylindrical rotary position readhead arrangements as taught in the incorporated '312 application.

An exemplary circular rotary embodiment may be understood by considering the scale 1190 shown in FIG. 10 to be a segment of a relatively planar rotary grating scale that rotates in its plane about an axis parallel to the Y-axis. In various exemplary circular rotary embodiments, the segment of scale 1190 shown in FIG. 9 is thus part of a 2D scale track that is at least slightly wider than the diameter of a circle encompassing the phase mask portions of the 2D optical fiber readhead arrangement 1120 along the direction of the measuring axis 82 (the radial direction) and that extends generally around an annular track that extends along the direction of the measuring axis 83 (the tangential direction) at a radius from the rotary axis that is at least several times the track width. In such a case, the measuring axis 83 follows a relatively planar circular path in the X-Z plane. In various exemplary embodiments, the radius is at least several times the track width away from the rotary axis to avoid excessive angular divergence of the scale pattern along the radial direction, relative to the nominal dimensions at the middle of the scale track and the nominal dimensions of the phase mask portions of the readhead.

For example, in one exemplary embodiment, the track width along the direction of the measuring axis 82 (the radial direction) is on the order of 2 mm, which provides a radial measuring range on the order of 1 mm for the 2D optical fiber readhead arrangement 1120 shown in FIG. 9. The nominal radius of the annular track is approximately 12.0 mm, and the nominal grating pitch along both the radial and tangential directions (the measuring axes 82 and 83, respectively) is 8.00 microns. Accordingly, over a 1 mm radial measuring range, the nominal scale grating pitch along the tangential direction will vary by a little more that 8%, which will degrade the accuracy of the sinusoidal signals arising from at least the readhead portion 1160', which is the angular measurement readhead portion, to some extent at various radial positions. It will be appreciated that with respect to the readhead portions 1160 and 1160", which are the radial measurement readhead portions, the nominal scale grating pitch along the radial direction will be constant. Such circular rotary embodiments may be useful in various measuring and/or positioning applications for simultaneously measuring angular displacement and radial run-out. Although such embodiments may be relatively less accurate than those that use 2D scales having purely linear and orthogonal measurement axes, in various exemplary embodiments the accuracy of such circular rotary embodiments will still be sufficient for a variety of useful applications. It should be appreciated that as the ratio of the track radius to the track width is increased, the accuracy of such circular rotary embodiments can approach the accuracy of the previously discussed linear-planar embodiments. Conversely, in various exemplary embodiments, as the track radius is increased the track width, that is, the radial measuring range, may be correspondingly increased.

A cylindrical rotary embodiment may be understood by considering the scale 1190 shown in FIG. 9 to be a segment of a relatively cylindrical grating scale that rotates about an axis parallel to the z-axis. In such a case, the measuring axis 82 follows a relatively cylindrical circular path that is circular in the X-Y plane. In various exemplary cylindrical rotary embodiments, the segment of scale 1190 shown in FIG. 9 is thus part of a 2D scale track that may have any desired dimension along the direction of the measuring axis 83 (the axial direction) and that extends generally around a circumferential track that extends along the direction of the measuring axis 83 (the tangential direction). In such a case, the measuring axis 83 follows a relatively planar circular path in the X-Z plane. It should be appreciated that the depth of field of the self-image plane must be considered in such cylindrical embodiments, as outlined above. That is, all portions of the self-image arising from the curved surface of the cylindrical scale that are spatially filtered and received by the various detector channels of the 2D optical fiber readhead arrangement 1120, must be operably "in focus". Thus, the radius of a 2D cylindrical scale must be sufficiently large relative to the various dimensions of the readhead mask portions and their overall spacing. In various exemplary embodiments, the illumination wavelength is on the order of 635 nm, the scale grating pitch is 8.00 microns, and each readhead portion is approximately 1.0 mm in diameter and spaced approximately 1.0 mm from neighboring readhead portions. For these approximate readhead parameters, a self-image that is operable to provide a good level of accuracy is achieved with a cylindrical radius on the order of 20 mm or more, in various exemplary embodiments. However, it should be appreciated that in various other exemplary embodiments, the cylindrical radius may be less than 20 mm, and the accuracy of such cylindrical rotary embodiments will still be sufficient for a variety of useful applications.

While this invention has been described in conjunction with the exemplary embodiments outlined above, it is evident that the embodiments and design factors described above are indicative of additional alternative embodiments, modifications and variations, as will be apparent to those skilled in the art. Accordingly, the embodiments of the invention, as set forth above, are intended to be illustrative, not limiting. Various changes may be made without departing from the spirit and scope of the invention.

The embodiments of the invention in which an exclusive property or privilege is claimed are defined as follows:

1. A 2D measuring device for measuring the relative position between two members, the device comprising:
   a 2D scale having a 2D scale grating extending along first and second measuring axis directions, the 2D scale grating comprising a 2D grating pattern that is periodic along a first scale grating direction according to a first grating pitch and periodic along a second scale grating direction according to a second grating pitch; and
   a readhead comprising at least a first self-image readhead portion corresponding to the first scale grating direction and a second self image readhead portion corresponding to the second scale grating direction, each self-image readhead portion operable to provide an operable self-image of the 2D scale grating, and each self-image readhead portion comprising:
      a light source portion comprising at least one respective light source element; and
      a plurality of fiber-optic receiver channels, each respective fiber-optic receiver channel comprising:
         a receiver channel spatial phase mask portion having a respective spatial phase provided by a plurality of light-blocking elements, the plurality of light-blocking elements being arranged at a spatial phase mask plane of the self image readhead portion and with a light-blocking element pitch that are operable for spatially filtering the operable self-image of the 2D scale grating along the corresponding scale grating direction; and
         at least one optical fiber having an input end arranged to receives receiver channel optical signal light through the spatial phase mask portion, the optical signal light collected over a collected light area having a dimension alone the corresponding scale grating direction that is at least one full period of the spatial phase mask portion;
   wherein, when the readhead is operably positioned relative to the 2D scale grating:
      at least first and second respective fiber-optic receiver channels of the first self-image readhead portion spatially filter the operable self-image of the 2D scale grating along the first scale grating direction to provide a plurality of respective receiver channel optical signals having respective optical signal phases that are output along respective optical fibers to provide relative displacement measurement information in the form of a first plurality of optical output signals, the first plurality of optical output signals arising from spatially filtered scale light without the use of an electronic photodetector element; and
      wherein the first plurality of optical output signals are usable to determine a first incremental position measurement for the first self-image readhead portion along the first scale grating direction;
      at least first and second respective fiber optic receiver channels of the second self image readhead portion spatially filter the operable self image of the 2D scale grating along the second scale grating direction to provide a plurality of respective receiver channel optical signals having respective optical signal phases that are output along respective optical fibers to provide relative displacement measurement information in the form of a second plurality of optical output signals, the second plurality of optical output signals arising from spatially filtered scale light without the use of an electronic photodetector element; and wherein the second plurality of optical output signals are usable to determine a second incremental position measurement for the second self image readhead portion along the second scale grating direction.

2. The 2D measuring device of claim 1 wherein the spatial phase mask plane of each self-image readhead portion nominally comprises a single nominal spatial phase mask plane for the entire readhead.

3. The 2D measuring device of claim 1 wherein for each self-image readhead portion at least each collected light area and each input end are positioned entirely within a cylindrical volume having an axis perpendicular to the spatial phase mask plane and having a cylinder radius that is at most 3 millimeters.

4. The 2D measuring device of claim 3 wherein:
   the spatial phase mask plane of each self-image readhead portion nominally comprises a single spatial phase mask plane for the entire readhead;
   the readhead comprises a transparent mask substrate; and
   for each self-image readhead portion:
      each receiver channel spatial phase mask portion is fabricated on a surface of the transparent mask substrate with its light-blocking elements positioned along the corresponding scale grating direction with respect to a nominal self-image pitch of the operable self-image of the 2D scale grating along that corresponding scale grating direction, and with respect to the light-blocking elements of the other receiver channel spatial phase mask portions of that self-image readhead portion, in a manner that establishes desired relationships between the respective spatial phases of the receiver channel spatial phase mask portions; and
      each receiver channel spatial phase mask portion is positioned entirely within the cylindrical volume of that self-image readhead portion.

5. The 2D measuring device of claim 4 wherein the input end of each receiver channel optical fiber is nominally positioned against the corresponding receiver channel spatial phase mask portion on the surface of the transparent mask substrate.

6. The 2D measuring device of claim 3 wherein the cylinder radius of each respective cylindrical volume containing at least the collected light area and input end is at most 2.0 millimeters.

7. The 2D measuring device of claim 6 wherein the cylinder radius of each respective cylindrical volume containing at least the collected light area and input end is at most 1.0 millimeter.

8. The 2D measuring device of claim 3 wherein for each self-image readhead portion:
for each respective fiber-optic receiver channel the collected light area dimension along the corresponding scale grating direction is at least three full periods of the spatial phase mask portion;
each light source element comprises a source optical fiber comprising a single-mode optical fiber, with light originating from a remote light source being output from a core area at an output end of the source optical fiber; and
the output end of each source optical fiber is positioned entirely within the cylindrical volume.

9. The 2D measuring device of claim 8 wherein for each self-image readhead portion:
each light source portion comprises a single source optical fiber; and
each respective fiber-optic receiver channel optical fiber is arranged in a close-pack arrangement around the source optical fiber.

10. The 2D measuring device of claim 9 wherein for each self-image readhead portion the plurality of fiber-optic receiver channels comprise at least 2N respective fiber-optic receiver channels arranged in an arrangement of N operable pairs, where N is an integer equal to at least 2, and each operable pair comprises two respective fiber-optic receiver channels arranged on opposite sides of the source optical fiber, wherein the two spatial phase mask portions corresponding to those two respective fiber-optic receiver channels have one of (a) the same spatial phase and (b) spatial phases that nominally differ by 180 degrees.

11. The 2D measuring device of claim 3 wherein the axes of the respective cylindrical volumes of at least two self-image readhead portions are offset from each other along the first measuring axis direction and those axes are offset from each other by less than the sum of their respective cylinder radii along the second measuring axis direction.

12. The 2D measuring device of claim 11 wherein the readhead comprises at least three self-image readhead portions and the axes of the respective cylindrical volumes of at least two self-image readhead portions are not substantially offset from each other along the first measuring axis direction and those axes are offset from each other by at least the sum of their respective cylinder radii along the second measuring axis direction.

13. The 2D measuring device of claim 3 wherein the respective cylindrical volumes of all the self-image readhead portions fit within an overall cylindrical volume having an axis parallel to the respective cylindrical volumes, the overall cylindrical volume having an overall cylinder radius that is at most 9 mm.

14. The 2D measuring device of claim 13 wherein the overall cylinder radius is at most 5 mm.

15. The 2D measuring device of claim 14 wherein the overall cylinder radius is at most 2.5 mm.

16. The 2D measuring device of claim 15 wherein the overall cylinder radius is at most 1.25 mm.

17. The 2D measuring device of claim 3 wherein when the readhead is operably positioned relative to the 2D scale grating:
for each self-image readhead portion a total illumination circle may be defined at its spatial phase mask plane such that at least 95% of the optical power included in the operable self-image due the light source portion of that self-image readhead portion is included in that total illumination circle, that total illumination circle having a corresponding total illumination radius; and
the axis of the cylindrical volume of each self-image readhead portion is spaced apart from the axis of the cylindrical volume of its closest neighboring self-image readhead portion by a distance that is at least as large as the sum of the their total illumination radii.

18. The 2D measuring device of claim 3 wherein, for each of at least two self-image readhead portions:
each light source element included in the self-image readhead portion comprises a source optical fiber and light originating from a controllable remote light source is output from an output end of the source optical fiber; and
the light originating from the controllable remote light source is controlled to be intermittently on and off, such that for at least part of a time period when one of the two self-image readhead portions is outputting respective optical output signals, the other of the two self-image readhead portions is outputting no light.

19. The 2D measuring device of claim 18 wherein when the readhead is operably positioned relative to the 2D scale grating, for each self image readhead portion a total illumination circle may be defined at its spatial phase mask plane such that at least 95% of the optical power included in the operable self-image due to the light source portion of that self image readhead portion is included in that total illumination circle, that total illumination circle having a corresponding total illumination radius; and
the axes of the respective cylindrical volumes of the at least two self-image readhead portions are spaced apart from each other by less than the sum of their respective total illumination radii.

20. The 2D measuring device of claim 3 wherein for at least two self-image readhead portions:
the light source portion of a first one of the self-image readhead portions provides a first respective wavelength of light;
the light source portion of a second one of the self-image readhead portions provides a second respective wavelength of light different from the first respective wavelength of light;
each of the first and second one of the self-image readhead portions includes a respective bandpass optical wavelength filter that matches its respective wavelength of light;
each respective bandpass filter is positioned relative to its readhead portion so as to substantially block any light that has a wavelength different from its respective wavelength of light from reaching each collected light area of that readhead portion.

21. The 2D measuring device of claim 20 wherein when the readhead is operably positioned relative to the 2D scale grating, for each self image readhead portion a total illumination circle may be defined at its spatial phase mask plane such that at least 95% of the optical power included in the operable self-image due to the light source portion of that self image readhead portion is included in that total illumination circle, that total illumination circle having a corresponding total illumination radius; and
the axes of the respective cylindrical volumes of the at least two self-image readhead portions are spaced apart from each other by less than the sum of their total illumination radii.

22. The 2D measuring device of claim 3 wherein for at least two self-image readhead portions:
   the light source portion of a first one of the self-image readhead portions provides light having a first polarization;
   the light source portion of a second one of the self-image readhead portions provides light having a second polarization different from the first polarization;
   each of the first and second one of the self-image readhead portions includes a respective polarization filter that matches its respective polarization of light;
   each respective polarization filter is positioned relative to its readhead portion so as to substantially block any light that has a polarization different from its respective polarization of light from reaching each collected light area of that readhead portion.

23. The 2D measuring device of claim 22 wherein when the readhead is operably positioned relative to the 2D scale grating, for each self image readhead portion a total illumination circle may be defined at its spatial phase mask plane such that at least 95% of the optical power included in the operable self-image due to the light source portion of that self image readhead portion is included in that total illumination circle, that total illumination circle having a corresponding total illumination radius; and
   the axes of the respective cylindrical volumes of the first and second one of the self-image readhead portions are spaced apart from each other by less than the sum of their total illumination radii.

24. The 2D measuring device of claim 2 wherein for at least two self-image readhead portions:
   the light source portion of a first one of the self-image readhead portions provides a first wavelength of light;
   the light source portion of a second one of the self-image readhead portions provides a second wavelength of light different from the first wavelength of light.

25. The 2D measuring device of claim 1 wherein:
   the 2D scale grating includes reflective elements;
   each light source portion emits source light along a respective source light path having a source light central axis that is oriented to intersect with the 2D scale grating along a direction which is nominally normal to a plane of the 2D scale grating at the point of intersection; and
   a scale light arising from the source light is reflected along a scale light path having a scale light central axis that is nominally aligned with the respective source light central axis when the readhead is nominally aligned relative to the 2D scale grating.

26. The 2D measuring device of claim 25 further comprising a reflective surface, wherein:
   the reflective surface is arranged to deflect each source light central axis and each scale light central axis by approximately 90 degrees at a location along the axes between the readhead and the 2D scale grating; and
   the readhead and reflective surface are arranged relative to the 2D scale such that the spatial phase mask planes and the operable self-images of the 2D scale grating are nominally perpendicular to the plane of the 2D scale grating at the point of intersection.

27. The 2D measuring device of claim 1 wherein the scale is a relatively planar circular scale, one of the measuring axis directions follows a circular path parallel to the plane of the scale and the other of the measuring axis directions everywhere follows a radial direction along a radius of the circular path.

28. The 2D measuring device of claim 1 wherein the scale is a relatively cylindrical scale, one of the measuring axis directions follows a circular path along the circumference of the cylindrical scale, and the other of the measuring axis directions follows a direction parallel to the axis of the cylindrical scale.

29. The 2D measuring device of claim 1 wherein:
   the readhead comprises at least a third self-image readhead portion, the third self-image readhead portion being similar to the first self-image readhead portion and oriented similarly to the first self-image readhead portion, and the first and third self-image readhead portions are located approximately symmetrically in the readhead on opposite sides of a center point on a line extending nominally parallel to the corresponding scale grating direction of the similarly oriented first and third self-image readhead portions and through an effective center of the second self-image readhead portion,
   such that averaging first and third incremental position measurements corresponding to the first and third self-image readhead portions provides a balanced-pair incremental position measurement that corresponds to the position of the center point relative to the 2D scale along the first scale grating direction, that balanced-pair incremental position measurement being substantially insensitive to yaw misalignment of the readhead about the center point.

30. The 2D measuring device of claim 29 wherein: the first and third incremental position measurements corresponding to the first and third self-image readhead portions are usable to determine a yaw misalignment of the readhead about the center point; and
   the determined yaw misalignment about the center point is usable to determine yaw misalignment error contribution to an incremental position measurement of at least the second self-image readhead portion, such that compensating the incremental position measurement of at least the second self-image readhead portion by the determined yaw misalignment error contribution provides a yaw-compensated incremental position measurement that corresponds to the position of the center point relative to the 2D scale along the second scale grating direction.

31. The 2D measuring device of claim 1 wherein, when there is relative displacement between the readhead and 2D scale grating along the first scale grating direction, each optical output signal of at least the first self-image readhead portion comprises a sinusoidal variation that is a function of the relative displacement, and each such sinusoidal variation varies from an ideal sinusoidal variation by at most $\frac{1}{32}$ of the peak-to-peak variation of each such sinusoidal variation.

32. The 2D measuring device of claim 31 wherein each such sinusoidal variation varies from an ideal sinusoidal variation by at most 1/64 of the peak-to-peak variation of each such sinusoidal variation.

33. The 2D measuring device of claim 1 wherein:
   the light source portion of the first self-image readhead portions provides a first wavelength of light;
   the light source portion of the second self-image readhead portions provides a second wavelength of light different from the first wavelength of light,
   each of the first and second self-image readhead portions output their respective optical output signals to at least one of (a) a respective bandpass optical wavelength filter that matches their respective wavelength of light and (b) a respective photodetector device having an optical wavelength response that effectively matches their respective wavelength of light, such that at least one of the respective bandpass optical wavelength filter and the respective photodetector device effectively stop any light that has a wavelength different from their respective wavelength of light from contributing to electronic signals arising from their respective optical output signals.

34. The 2D measuring device of claim 1 wherein the first scale grating direction is the same as the first measuring axis direction and the second scale grating direction is the same as the second measuring axis direction.

35. The 2D measuring device of claim 34 wherein the first and second grating pitches are substantially equal.

36. The 2D measuring device of claim 34 wherein the first and second measuring axis directions are orthogonal.

* * * * *

UNITED STATES PATENT AND TRADEMARK OFFICE
CERTIFICATE OF CORRECTION

PATENT NO. : 7,091,475 B2
APPLICATION NO. : 10/434508
DATED : August 15, 2006
INVENTOR(S) : J.D. Tobiason It is certified that error appears in the above-identified patent and that said Letters Patent is hereby corrected as shown below:

| COLUMN | LINE | |
|---|---|---|
| (74) Pg. 1, col. 2 | Attorney, Agent, or Firm | after "O'Connor" delete "," |
| 33 (Claim 1, line 30) | 50 | "receives" should read --receive-- |
| 33 (Claim 1, line 33) | 53 | "alone" should read --along-- |
| 35 (Claim 8, line 3) | 7 | after "channel" insert --,-- |
| 36 (Claim 17, line 7) | 1 | "due the light" should read --due to the light-- |
| 36 (Claim 17, line 15) | 9 | "the their" should read --their-- |
| 36 (Claim 18, line 6) | 14 | after "light source" insert --that-- |

UNITED STATES PATENT AND TRADEMARK OFFICE
CERTIFICATE OF CORRECTION

PATENT NO. : 7,091,475 B2
APPLICATION NO. : 10/434508
DATED : August 15, 2006
INVENTOR(S) : J.D. Tobiason It is certified that error appears in the above-identified patent and that said Letters Patent is hereby corrected as shown below:

COLUMN     LINE

38     30     after "wherein:" insert a paragraph break
(Claim 30, line 1)

Signed and Sealed this

Thirtieth Day of January, 2007

JON W. DUDAS
*Director of the United States Patent and Trademark Office*